(12) United States Patent
Sugai

(10) Patent No.: US 12,390,993 B2
(45) Date of Patent: Aug. 19, 2025

(54) THREE-DIMENSIONAL-OBJECT PRINTING APPARATUS

(71) Applicant: SEIKO EPSON CORPORATION, Tokyo (JP)

(72) Inventor: Keigo Sugai, Chino (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 17/303,410

(22) Filed: May 28, 2021

(65) Prior Publication Data

US 2021/0370592 A1 Dec. 2, 2021

(30) Foreign Application Priority Data

Jun. 1, 2020 (JP) ................................ 2020-095322

(51) Int. Cl.
*B29C 64/209* (2017.01)
*B29C 64/112* (2017.01)
*B29C 64/241* (2017.01)
*B29C 64/321* (2017.01)
(Continued)

(52) U.S. Cl.
CPC .......... *B29C 64/209* (2017.08); *B29C 64/112* (2017.08); *B29C 64/241* (2017.08); *B29C 64/321* (2017.08); *B33Y 30/00* (2014.12); *B33Y 40/00* (2014.12)

(58) Field of Classification Search
CPC ... B29C 64/209; B29C 64/321; B29C 64/112; B29C 64/241; B33Y 30/00; B33Y 40/00; B25J 9/0009; B25J 9/0096; B25J 9/06; B25J 11/0045; B25J 11/0075
See application file for complete search history.

(56) References Cited

U.S. PATENT DOCUMENTS

| | | | | |
|---|---|---|---|---|
| 2,852,033 A | * | 9/1958 | Orser | F16L 55/052 |
| | | | | 137/115.26 |
| 5,893,490 A | * | 4/1999 | Gnyp | B25J 19/0025 |
| | | | | 222/526 |
| 2017/0252765 A1 | * | 9/2017 | Medard | B41J 3/4073 |

(Continued)

FOREIGN PATENT DOCUMENTS

| | | |
|---|---|---|
| EP | 3415240 | 12/2018 |
| JP | 2006272297 A | 10/2006 |

(Continued)

*Primary Examiner* — Galen H Hauth
*Assistant Examiner* — John Robitaille
(74) *Attorney, Agent, or Firm* — WORKMAN NYDEGGER

(57) ABSTRACT

A three-dimensional-object printing apparatus includes: a base; an arm supported by the base; a liquid ejecting head that is fixed to a tip end of the arm and ejects a liquid onto a work piece; a liquid accumulation section that accumulates the liquid; a supply channel which enables the liquid accumulation section and the liquid ejecting head to communicate with each other and along which the liquid is supplied from the liquid accumulation section to the liquid ejecting head; and a pressure control valve that is provided halfway in the supply channel and controls a pressure of the liquid supplied to the liquid ejecting head, in which the arm includes N movable sections that three-dimensionally change a position and an orientation of the liquid ejecting head, N being 1 or more, and the pressure control valve is fixed to the arm.

15 Claims, 12 Drawing Sheets

(51) Int. Cl.
*B33Y 30/00* (2015.01)
*B33Y 40/00* (2020.01)

(56) References Cited

U.S. PATENT DOCUMENTS

| | | |
|---|---|---|
| 2019/0022851 A1 | 1/2019 | Konno et al. |
| 2020/0130004 A1 | 4/2020 | Le Strat |
| 2022/0274419 A1 | 9/2022 | Hozumi et al. |

FOREIGN PATENT DOCUMENTS

| | | | |
|---|---|---|---|
| JP | 2010100011 A | 5/2010 | |
| JP | 2011218596 A | 11/2011 | |
| JP | 2011224864 A | 11/2011 | |
| JP | 2016-131914 | 7/2016 | |
| JP | 2016-175358 | 10/2016 | |
| JP | 2016215438 A | 12/2016 | |
| JP | 2019206086 A | 12/2019 | |
| WO | WO-2017071934 A1 * | 5/2017 | .............. A23P 30/00 |
| WO | 2021-040034 A | 3/2021 | |

* cited by examiner

THREE-DIMENSIONAL-OBJECT PRINTING APPARATUS

The present application is based on, and claims priority from JP Application Serial Number 2020-095322, filed Jun. 1, 2020, the disclosure of which is hereby incorporated by reference herein in its entirety.

BACKGROUND

1. Technical Field

The present disclosure relates to a three-dimensional-object printing apparatus.

2. Related Art

Three-dimensional-object printing apparatuses that perform printing on a surface of a three-dimensional object by using an ink jet method have been known. For example, an apparatus described in JP-A-2016-175358 includes an ink jet head that ejects ink, a robot arm that is able to change a direction in which the ink jet head ejects ink, and an ink tank that supplies ink to the ink jet head.

In the apparatus described in JP-A-2016-175358, pressure according to a water head difference between the ink in the ink jet head and the ink in the ink tank is applied to the ink in the ink jet head. Therefore, in the apparatus described in JP-A-2016-175358, the pressure of the ink in the ink jet head changes in accordance with a change in a positional relationship between the ink jet head and the ink tank in the up-down direction, resulting in a problem of a change in ejection characteristics of the ink in the ink jet head.

SUMMARY

To address the aforementioned problem, an aspect of a three-dimensional-object printing apparatus according to the disclosure includes: a base; an arm supported by the base; a liquid ejecting head that is fixed to a tip end of the arm and ejects a liquid onto a work piece; a liquid accumulation section that accumulates the liquid; a supply channel which enables the liquid accumulation section and the liquid ejecting head to communicate with each other and along which the liquid is supplied from the liquid accumulation section to the liquid ejecting head; and a pressure control valve that is provided halfway in the supply channel and controls a pressure of the liquid supplied to the liquid ejecting head, in which the arm includes N movable sections that change an angle of the liquid ejecting head with respect to a horizontal plane, N being 1 or more, the pressure control valve is fixed to the arm, and K pieces of the movable sections are provided between the pressure control valve and the base, K being 1 or more and N or less.

DESCRIPTION OF EXEMPLARY EMBODIMENTS

Figure 1:
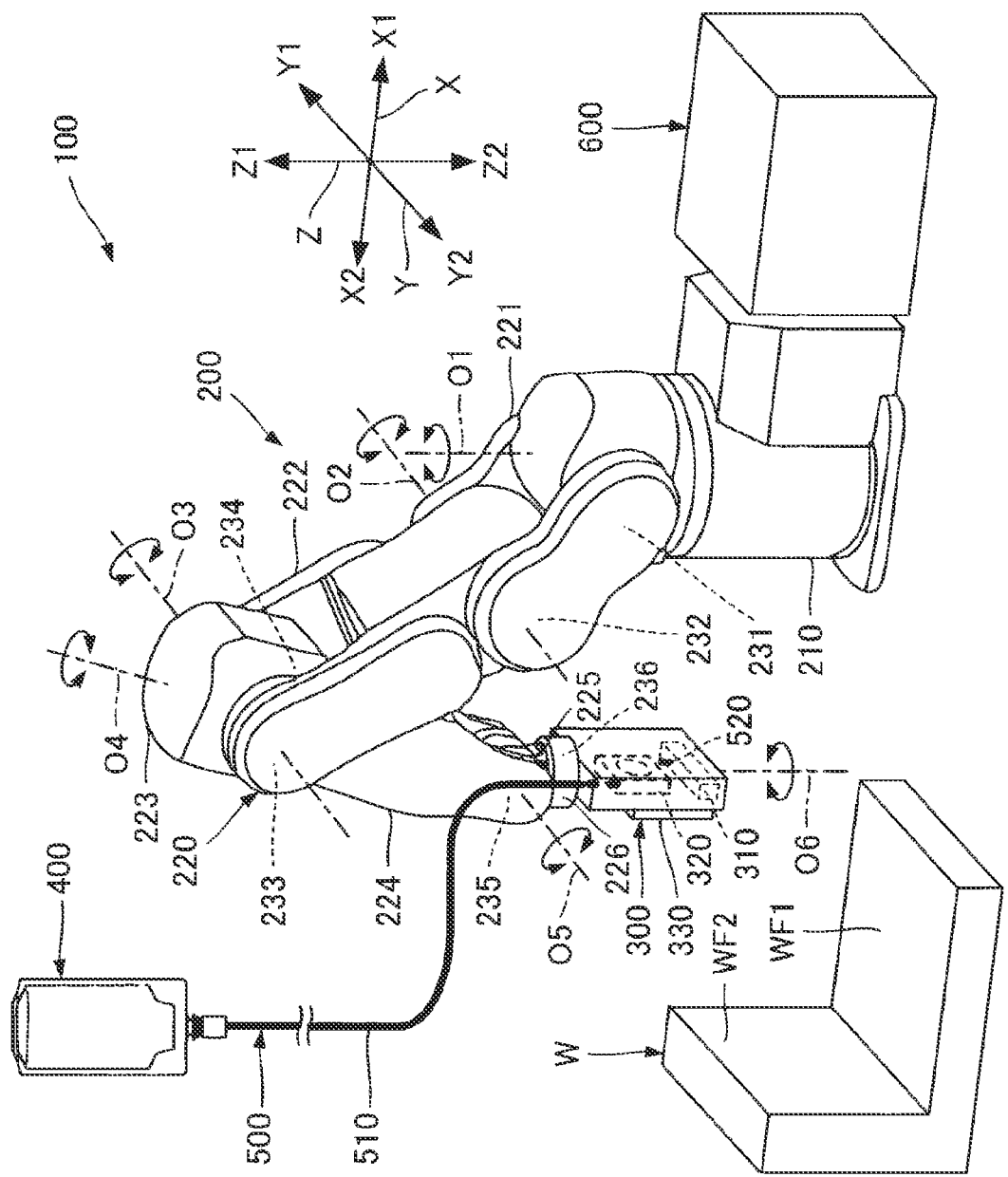
FIG. 1 is a perspective view illustrating an outline of a three-dimensional-object printing apparatus according to a first embodiment.

Suitable embodiments according to the disclosure will be described below with reference to the accompanying drawings. Note that, in the drawings, dimensions or scales of components appropriately differ from actual ones, and some components are schematically illustrated for easy understanding. The scope of the disclosure is not limited to the embodiments as long as there is no description particularly limiting the disclosure in the following description.

Note that the following description will be given by appropriately using the X-axis, the Y-axis, and the Z-axis that cross each other. A direction extending along the X-axis is referred to as direction X1, and a direction opposite to direction X1 is referred to as direction X2. Similarly, directions opposite to each other along the Y-axis are referred to as direction Y1 and direction Y2. Directions opposite to each other along the Z-axis are referred to as direction Z1 and direction Z2.

Here, the Z-axis is an axis extending in the up-down direction, and direction Z2 corresponds to the down direction of the up-down direction. Here the up-down direction is the gravity direction. Accordingly, the X-axis and the Y-axis are axes extending along a horizontal plane. Note that the X-axis, the Y-axis, and the Z-axis are typically orthogonal to each other but are not limited thereto. They may cross each other at an angle in a range of, for example, 80° to 100°.

1. First Embodiment 1-1. Outline of Three-Dimensional-Object Printing Apparatus FIG. 1 is a perspective view illustrating an outline of a three-dimensional-object printing apparatus 100 according to a first embodiment. The three-dimensional-object printing apparatus 100 is an apparatus that performs, by using an ink jet method, printing on a surface of a work piece W which is an example of a three-dimensional object. In the example illustrated in FIG. 1, the work piece W has a surface WF1 and a surface WF2 that are orthogonal to each other. The surface WF1 is a flat surface facing direction Z1. The surface WF2 is a flat surface facing direction X1. Note that a shape of the work piece W is not limited to the example illustrated in FIG. 1 and may be any shape.

In the example illustrated in FIG. 1, the three-dimensional-object printing apparatus 100 is an ink jet printer using a vertical articulated robot. Specifically, as illustrated in FIG. 1, the three-dimensional-object printing apparatus 100 includes a robot 200, a liquid ejecting head unit 300, a liquid accumulation section 400, a supply channel 500, and a control device 600. Hereinafter, first, the respective sections of the three-dimensional-object printing apparatus 100 will be briefly described sequentially.

The robot 200 is a so-called six-axis vertical articulated robot. Specifically, the robot 200 includes a base 210 and an arm 220.

The base 210 is a stand supporting the arm 220. In the example illustrated in FIG. 1, the base 210 is fixed, by screwing or the like, to an installation surface, such as a floor surface, which faces direction Z1. Note that the installation surface to which the base 210 is fixed may be a surface facing any direction, is not limited to the example illustrated in FIG. 1, and may be, for example, a wall, a ceiling, or a surface of a movable wagon or the like.

The arm 220 is a six-axis robot arm having a base end that is attached to the base 210 and a tip end that three-dimensionally changes a position and an orientation with respect to the base end. Specifically, the arm 220 has arms 221, 222, 223, 224, 225, and 226 that are coupled in this order.

The arm 221 is coupled to the base 210 via a joint section 231 so as to be pivotable about a first pivot axis O1. The arm 222 is coupled to the arm 221 via a joint section 232 so as to be pivotable about a second pivot axis O2. The arm 223 is coupled to the arm 222 via a joint section 233 so as to be pivotable about a third pivot axis O3. The arm 224 is coupled to the arm 223 via a joint section 234 so as to be pivotable about a fourth pivot axis O4. The arm 225 is coupled to the arm 224 via a joint section 235 so as to be pivotable about a fifth pivot axis O5. The arm 226 is coupled to the arm 225 via a joint section 236 so as to be pivotable about a sixth pivot axis O6.

Here, the joint sections 231 to 236 are each an example of a movable section. In the example illustrated in FIG. 1, the joint sections 231 to 236 are each a mechanism that couples two adjacent arms such that one of the arms is pivotable with respect to the other arm. Although not illustrated, a driving mechanism that enables one of two adjacent arms to pivot with respect to the other arm is provided in each of the joint sections 231 to 236. The driving mechanism includes, for example, a motor that generates a pivot driving force, a decelerator that decelerates and outputs the driving force, and an encoder such as a rotary encoder that detects, for example, a pivot angle. Note that the driving mechanism corresponds to an arm driving mechanism 230 illustrated in FIG. 2 described later.

The first pivot axis O1 is an axis perpendicular to the installation surface (not illustrated) to which the base 210 is fixed. The second pivot axis O2 is an axis perpendicular to the first pivot axis O1. The third pivot axis O3 is an axis parallel to the second pivot axis O2. The fourth pivot axis O4 is an axis perpendicular to the third pivot axis O3. The fifth pivot axis O5 is an axis perpendicular to the fourth pivot axis O4. The sixth pivot axis O6 is an axis perpendicular to the fifth pivot axis O5.

Note that, regarding the pivot axes, the term "perpendicular" includes not only a case in which an angle formed by two pivot axes is strictly 90° but also a case in which an angle formed by two pivot axes deviates from 90° within a range of about ±5°. Similarly, the term "parallel" includes not only a case in which two pivot axes are strictly parallel to each other but also a case in which one of two pivot axes is inclined with respect to the other pivot axis at an angle within a range of about ±5°.

To a tip end of the arm 221 described above, that is, the arm 226, the liquid ejecting head unit 300 is attached as an end effector.

The liquid ejecting head unit 300 is a mechanism having a liquid ejecting head 310 for ejecting ink which is an example of a liquid onto the work piece W. In the present embodiment, the liquid ejecting head unit 300 has, in addition to the liquid ejecting head 310, a pressure control valve 320 that controls pressure of the ink supplied to the liquid ejecting head 310 and a displacement sensor 330 that measures a distance to the work piece W. Since both the pressure control valve 320 and the displacement sensor 330 are fixed to the arm 226, a relationship in the position and the orientation therebetween is fixed.

The liquid ejecting head 310 and the pressure control valve 320 will be described in detail later. The displacement sensor 330 is, for example, an optical displacement sensor that measures a displacement amount during movement from one position to another position. Note that the displacement sensor 330 may be provided as needed or may be omitted. Further, in the example illustrated in FIG. 1, the numbers of liquid ejecting heads 310 and pressure control valves 320 of the liquid ejecting head unit 300 are both one, but each of the numbers is not limited to the example illustrated in FIG. 1 and may be two or more.

The liquid accumulation section 400 is a container that accumulates the ink. The liquid accumulation section 400 is, for example, a bag-like ink pack formed from a flexible film. The ink accumulated in the liquid accumulation section 400 is ink containing a color material such as dye or pigment. Note that a type of ink accumulated in the liquid accumulation section 400 is not limited to the ink containing a color material, and ink containing, for example, a conductive material such as metal powder may be used. Moreover, curable ink such as ultraviolet curable ink may be used. When curable ink such as ultraviolet curable ink is used, an ultraviolet ray radiation mechanism may be mounted, for example, on the liquid ejecting head unit 300.

In the example illustrated in FIG. 1, the liquid accumulation section 400 is fixed to a wall, a ceiling, a post, or the like so as to be always positioned in direction Z1 with respect to the liquid ejecting head 310. That is, the liquid accumulation section 400 is positioned above a movement region of the liquid ejecting head 310 in the up-down direction. Therefore, without using a mechanism such as a pump, ink is able to be supplied from the liquid accumulation section 400 to the liquid ejecting head 310 with a predetermined pressurizing force.

Note that the liquid accumulation section 400 may be installed in any place as long as ink is able to be supplied from the liquid accumulation section 400 to the liquid ejecting head 310 with a predetermined pressure and may be positioned below the liquid ejecting head 310 in the up-down direction. In this case, for example, as in a fourth embodiment described later, a pump may be used to supply ink from the liquid accumulation section 400 to the liquid ejecting head 310 with a predetermined pressure.

The supply channel 500 is a channel along which the ink is supplied from the liquid accumulation section 400 to the liquid ejecting head 310. The pressure control valve 320 is provided halfway in the supply channel 500. Thus, even when a positional relationship between the liquid ejecting head 310 and the liquid accumulation section 400 changes, it is possible to reduce a change in the pressure of the ink in the liquid ejecting head 310.

The supply channel 500 is divided into an upstream channel 510 and a downstream channel 520 by the pressure control valve 320. That is, the supply channel 500 has the upstream channel 510 that enables the liquid accumulation section 400 and the pressure control valve 320 to communicate with each other and the downstream channel 520 that enables the pressure control valve 320 and the liquid ejecting head 310 to communicate with each other.

The upstream channel 510 and the downstream channel 520 are each constituted by, for example, an inner space of a tubular body. Here, the tubular body used for the upstream channel 510 is formed from an elastic material such as a rubber material or an elastomer material and has flexibility. When the upstream channel 510 is constituted by using the flexible tubular body as described above, a relative positional relationship between the liquid accumulation section 400 and the pressure control valve 320 is able to change. Thus, even when the position or the orientation of the liquid ejecting head 310 changes while the position and the orientation of the liquid accumulation section 400 are fixed, the ink is able to be supplied from the liquid accumulation section 400 to the pressure control valve 320. On the other hand, a tubular body used for the downstream channel 520 may be non-flexible. Thus, the tubular body used for the downstream channel 520 may be formed from an elastic material such as a rubber material or an elastomer material or may be formed from a hard material such as a resin material.

Note that a portion of the upstream channel 510 may be constituted by a non-flexible member. Moreover, the downstream channel 520 is not limited to being constituted by using a tubular body. For example, a portion or a whole of the downstream channel 520 may be configured to have a distribution channel along which the ink from the pressure control valve 320 is distributed to multiple portions or may be configured to be integrated with the liquid ejecting head 310 or the pressure control valve 320.

The control device 600 is a device that controls driving of the respective sections of the three-dimensional-object printing apparatus 100. The control device 600 will be described in detail with the following description for an electrical configuration of the three-dimensional-object printing apparatus 100.

1-2. Electrical Configuration of Three-Dimensional-Object Printing Apparatus

Figure 2:
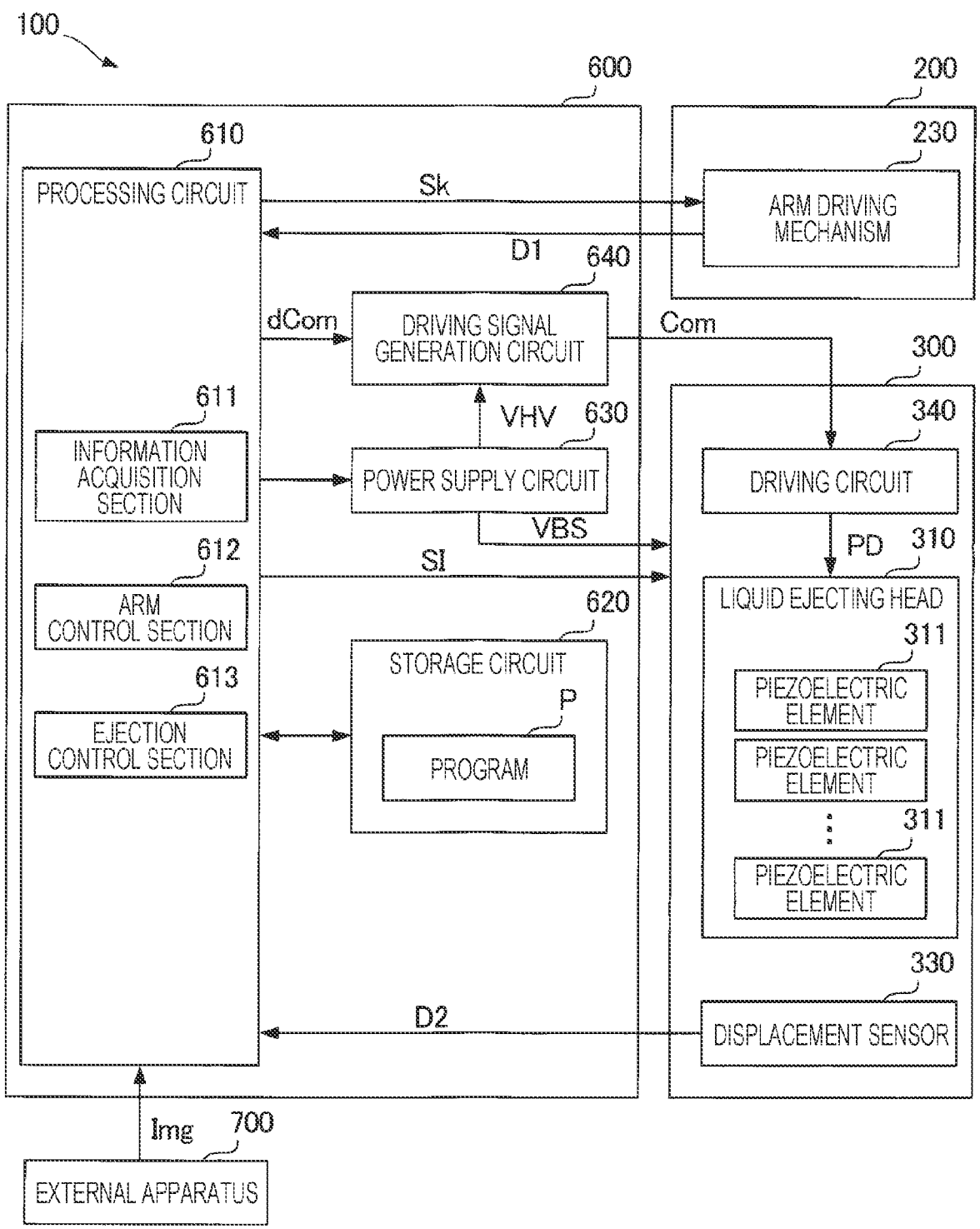
FIG. 2 is a block diagram illustrating an electrical configuration of the three-dimensional-object printing apparatus according to the first embodiment.

FIG. 2 is a block diagram illustrating the electrical configuration of the three-dimensional-object printing apparatus 100 according to the first embodiment. FIG. 2 illustrates electrical components of the components of the three-dimensional-object printing apparatus 100. As illustrated in FIG. 2, the control device 600 includes a processing circuit 610, a storage circuit 620, a power supply circuit 630, and a driving signal generation circuit 640.

The processing circuit 610 has a function of controlling operation of the respective sections of the three-dimensional-object printing apparatus 100 and a function of processing various kinds of data. The processing circuit 610 includes, for example, one or more processors such as CPUs (central processing units). Note that the processing circuit 610 may include a programmable logic device such as an FPGA (field-programmable gate array) instead of or in addition to a CPU. Note that, the hardware configuration of the control device 600 may be appropriately divided. For example, an arm control section 612 and the driving signal generation circuit 640 of the control device 600 are individually provided in different hardware configurations in some instances. Moreover, some or all of the functions of the control device 600 may be achieved by an external apparatus coupled to the three-dimensional-object printing apparatus 100 via a network such as a LAN (local area network) or the Internet.

The storage circuit 620 stores various programs such as a program P executed by the processing circuit 610 and various kinds of data such as print data Img processed by the processing circuit 610. The storage circuit 620 includes semiconductor memory of, for example, one or both of volatile memory such as RAM (random access memory) and non-volatile memory such as ROM (read-only memory), EEPROM (electrically erasable programmable read-only memory), or PROM (Programmable ROM). The print data Img is supplied from an external apparatus 700 such as a personal computer. Note that the storage circuit 620 may constitute a portion of the processing circuit 610.

Upon supply of electric power from a commercial power supply (not illustrated), the power supply circuit 630 generates various predetermined potentials. The various generated potentials are appropriately supplied to the respective sections of the three-dimensional-object printing apparatus 100. The power supply circuit 630 generates, for example, a power supply potential VHV and an offset potential VBS. The offset potential VBS is supplied to the liquid ejecting head unit 300. The power supply potential VHV is supplied to the driving signal generation circuit 640.

The driving signal generation circuit 640 is a circuit that generates a driving signal Com for driving piezoelectric elements 311, which will be described later, of the liquid ejecting head 310. Specifically, the driving signal generation circuit 640 includes, for example, a DA conversion circuit and an amplification circuit. In the driving signal generation circuit 640, the DA conversion circuit converts a digital waveform specification signal dCom, which will be described later, from the processing circuit 610 into an analog signal, and the amplification circuit amplifies the analog signal by using the power supply potential VHV from the power supply circuit 630, thereby generating the driving signal Com. Here, a signal of a waveform actually supplied to a piezoelectric element 311 among waveforms included in the driving signal Com is a driving pulse PD.

The control device 600 described above controls operation of the respective sections of the three-dimensional-object printing apparatus 100 through the processing circuit 610 executing the program P stored in the storage circuit 620. Specifically, the processing circuit 610 functions as an information acquisition section 611, the arm control section 612, and an ejection control section 613 by executing the program P.

The information acquisition section 611 acquires various kinds of information necessary for driving the robot 200 and the liquid ejecting head unit 300. Specifically, the information acquisition section 611 acquires the print data Img from the external apparatus 700, information D1 from an encoder included in the arm driving mechanism 230, and information D2 from the displacement sensor 330. Additionally, the information acquisition section 611 appropriately reads and acquires information to be stored in the storage circuit 620 and appropriately stores, in the storage circuit 620, various kinds of information that are acquired.

The arm control section 612 controls driving of the robot 200 based on the information from the information acquisition section 611. Specifically, the arm control section 612 generates a control signal Sk based on three-dimensional shape data of the work piece W and the information D1 from the arm driving mechanism 230. With the control signal Sk, driving of a motor included in the arm driving mechanism 230 is controlled such that the liquid ejecting head 310 is located in a desired orientation at a desired position. The three-dimensional shape data is, for example, included in the print data Img or obtained by measurement with the displacement sensor 330 or the like. Note that a corresponding relationship between the information D1 and the position and the orientation of the liquid ejecting head is acquired by calibration or the like and stored in the storage circuit 620 in advance. Based on the actual information D1 from the arm driving mechanism 230 and the corresponding relationship, the arm control section 612 acquires information about the actual position and orientation of the liquid ejecting head 310. Then, the arm control section 612 performs control by using the information about the position and the orientation. The arm control section 612 may appropriately adjust, by using the information D2 from the displacement sensor 330, the control signal Sk such that a distance between the liquid ejecting head 310 and a surface of the work piece W is kept within a given range.

The ejection control section 613 controls driving of the liquid ejecting head unit 300 based on the information from the information acquisition section 611. Specifically, the ejection control section 613 generates, based on the print data Img, a control signal SI and the waveform specification signal dCom. The control signal SI is a digital signal for specifying an operation state of the piezoelectric element 311, which will be described below, of the liquid ejecting head 310. Here, the control signal SI may include another signal such as a timing signal for defining a timing of driving the piezoelectric element 311. The timing signal is generated based on, for example, the information D1 from the encoder included in the arm driving mechanism 230. The waveform specification signal dCom is a digital signal for defining a waveform of the driving signal Com.

1-3. Liquid Ejecting Head and Pressure Control Valve

Figure 3:
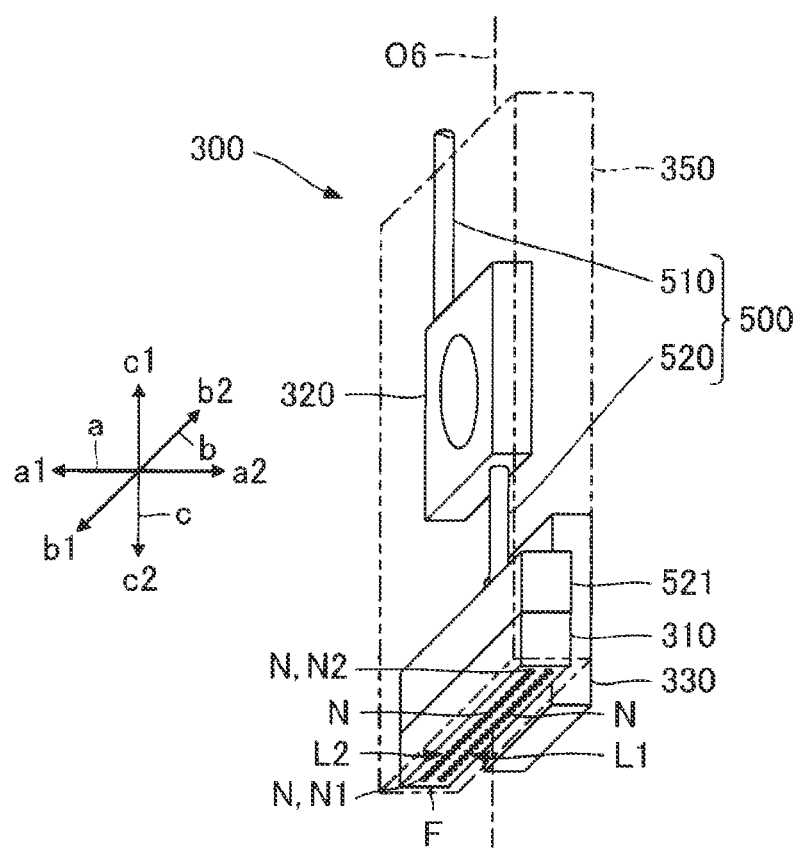
FIG. 3 is a perspective view illustrating a schematic configuration of a liquid ejecting head unit in the first embodiment.

FIG. 3 is a perspective view illustrating a schematic configuration of the liquid ejecting head unit 300 in the first embodiment.

The following description will be given by appropriately using the a-axis, the b-axis, and the c-axis that cross each other. A direction extending along the a-axis is referred to as direction a1, and a direction opposite to direction a1 is referred to as direction a2. Similarly, directions opposite to each other along the b-axis are referred to as direction b1 and direction b2, and directions opposite to each other along the c-axis are referred to as direction c1 and direction c2.

Here, the c-axis is an axis parallel to the sixth pivot axis O6 described above. Note that the a-axis, the b-axis, and the c-axis are typically orthogonal to each other but are not limited thereto. They may cross each other at an angle in a range of, for example, 80° to 100°.

As described above, the liquid ejecting head unit 300 includes the liquid ejecting head 310, the pressure control valve 320, and the displacement sensor 330. They are supported by a support body 350 indicated by a two-dot chain line in FIG. 3.

The support body 350 is formed from, for example, a metal material and is a substantially rigid body. Note that the support body 350 has a flat box shape in FIG. 3, but the shape of the support body 350 is not particularly limited and may be any shape.

The support body 350 described above is attached to the tip end of the arm 220 described above, that is, the arm 226. Therefore, the liquid ejecting head 310, the pressure control valve 320, and the displacement sensor 330 are each fixed to the arm 226. Note that the term "fixed" means that two members are fixed to each other in terms of position and orientation and includes not only a case in which two members are directly fixed but also a case in which two members are fixed via another member.

In the example illustrated in FIG. 3, the pressure control valve 320 is positioned in direction c1 with respect to the liquid ejecting head 310. The displacement sensor 330 is positioned in direction a2 with respect to the liquid ejecting head 310.

In the example illustrated in FIG. 3, a portion of the downstream channel 520 of the supply channel 500 is constituted by a channel member 521. The channel member 521 has a channel along which the ink from the pressure control valve 320 is distributed to multiple portions of the liquid ejecting head 310. The channel member 521 is a layered structure of a plurality of substrates formed from, for example, a resin material, and each of the substrates is appropriately provided with a groove or a hole for a channel of the ink.

The liquid ejecting head 310 includes a nozzle surface F and a plurality of nozzles N that open on the nozzle surface F. In the example illustrated in FIG. 3, a direction normal to the nozzle surface F is direction c2, and the plurality of nozzles N are divided into a first nozzle row L1 and a second nozzle row L2 that are arrayed with a gap therebetween in the a-axis direction. The first nozzle row L1 and the second nozzle row L2 are each a set of a plurality of nozzles N arrayed linearly in the b-axis direction. Here, the configuration is such that elements related to the respective nozzles N of the first nozzle row L1 and elements related to the respective nozzles N of the second nozzle row L2 in the liquid ejecting head 310 are substantially symmetrical to each other in the a-axis direction.

Note that the plurality of nozzles N of the first nozzle row L1 and the plurality of nozzles N of the second nozzle row L2 may coincide with or differ from each other in position in the b-axis direction. Moreover, the elements related to the respective nozzles N of either the first nozzle row L1 or the second nozzle row L2 may be omitted. In the following description, a configuration in which the plurality of nozzles N of the first nozzle row L1 and the plurality of nozzles N of the second nozzle row L2 coincide with each other in position in the b-axis direction is exemplified.

Figure 4:
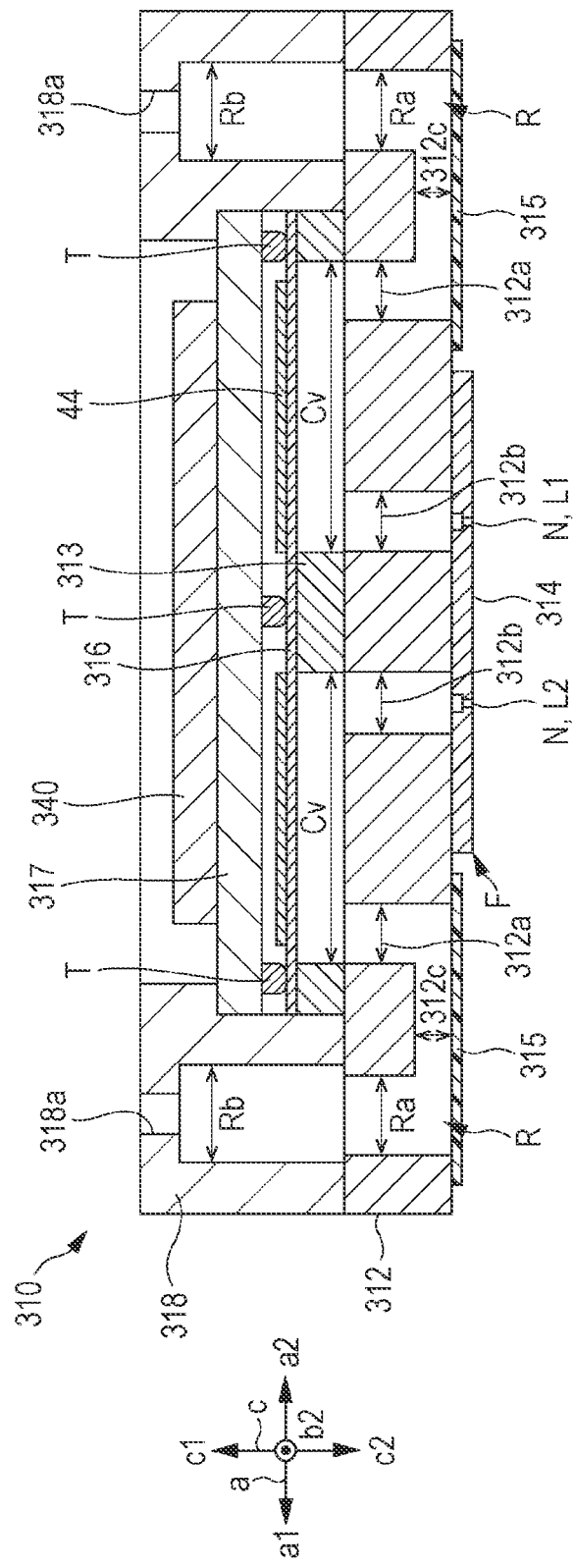
FIG. 4 is a sectional view illustrating an example of a configuration of a liquid ejecting head in the first embodiment.

FIG. 4 is a sectional view illustrating an example of a configuration of the liquid ejecting head 310 in the first embodiment. As illustrated in FIG. 4, the liquid ejecting head 310 includes a channel substrate 312, a pressure chamber substrate 313, a nozzle plate 314, a vibration absorber 315, a vibrating plate 316, the plurality of piezoelectric elements 311, a wiring substrate 317, and a housing 318.

The channel substrate 312 and the pressure chamber substrate 313 constitute a channel for supplying the ink to the plurality of nozzles N. The channel substrate 312 and the pressure chamber substrate 313 are layered in direction c1 in this order. The channel substrate 312 and the pressure chamber substrate 313 are each a plate member elongated in the b-axis direction. The channel substrate 312 and the pressure chamber substrate 313 are bonded to each other with, for example, an adhesive.

In a region further than the pressure chamber substrate 313 in direction c1, the vibrating plate 316, the wiring substrate 317, the housing 318, and a driving circuit 340 are installed. On the other hand, in a region further than the channel substrate 312 in direction c2, the nozzle plate 314 and the vibration absorber 315 are installed. Schematically, the respective elements are plate members elongated in the b-axis direction similarly to the channel substrate 312 and the pressure chamber substrate 313 and are bonded to each other with, for example, an adhesive.

The nozzle plate 314 is a plate member in which the plurality of nozzles N are formed. The plurality of nozzles N are each a circular through hole through which the ink passes. Here, a surface of the nozzle plate 314 which faces direction c2 is the nozzle surface F described above. The nozzle plate 314 is manufactured, for example, in such a manner that a silicon monocrystalline substrate is processed by using a semiconductor manufacturing technique with a processing technique such as dry etching or wet etching. Note that other known processes and materials may be appropriately used to manufacture the nozzle plate 314.

In the channel substrate 312, a space Ra, a plurality of supply channels 312a, a plurality of communication channels 312b, and a supply liquid chamber 312c are provided for each of the first nozzle row L1 and the second nozzle row L2. The space Ra is an elongated opening extending in the b-axis direction when viewed in plan view in the c-axis direction. A supply channel 312a and a communication channel 312b are each a through hole formed for each of the nozzles N. The supply liquid chamber 312c is an elongated space extending in the b-axis direction across the plurality of nozzles N and enables the space Ra and the plurality of supply channels 312a to communicate with each other. Each of the plurality of communication channels 312b overlaps one nozzle N corresponding to the communication channel 312b in plan view.

The pressure chamber substrate 313 is a plate member in which a plurality of pressure chambers Cv called cavities are formed for each of the first nozzle row L1 and the second nozzle row L2. The plurality of pressure chambers Cv are arrayed in the b-axis direction. A pressure chamber Cv is formed for each of the nozzles N and is an elongated space extending in the a-axis direction in plan view. Similarly to the nozzle plate 314 described above, the channel substrate 312 and the pressure chamber substrate 313 are each manufactured, for example, in such a manner that a silicon monocrystalline substrate is processed by using a semiconductor manufacturing technique. Note that other known processes and materials may be appropriately used to manufacture each of the channel substrate 312 and the pressure chamber substrate 313.

The pressure chamber Cv is a space positioned between the channel substrate 312 and the vibrating plate 316. The plurality of pressure chambers Cv are arrayed in the b-axis direction for each of the first nozzle row L1 and the second nozzle row L2. The pressure chamber Cv communicates with each of the communication channel 312b and the supply channel 312a. Thus, the pressure chamber Cv communicates with a corresponding one of the nozzles N via the communication channel 312b and communicates with the space Ra via the supply channel 312a and the supply liquid chamber 312c.

The vibrating plate 316 is arranged on a surface of the pressure chamber substrate 313 which faces direction c1. The vibrating plate 316 is a plate member capable of elastically vibrating. The vibrating plate 316 has, for example, an elastic film made of silicon oxide ($SiO_2$) and an insulating film made of zirconium oxide ($ZrO_2$), which are layered. The elastic film is formed by, for example, thermally oxidizing one surface of a silicon monocrystalline substrate. The insulating film is formed by, for example, forming a zirconium layer by using a sputtering method and thermally oxidizing the layer.

On a surface of the vibrating plate 316 which faces direction c1, the plurality of piezoelectric elements 311 corresponding to the respective nozzles N are arranged for each of the first nozzle row L1 and the second nozzle row L2. The piezoelectric elements 311 are each a passive element that deforms upon supply of the driving pulse PD described above. The piezoelectric elements 311 are each elongated so as to extend in the a-axis direction in plan view. The plurality of piezoelectric elements 311 corresponding to the plurality of pressure chambers Cv are arrayed in the b-axis direction. When the vibrating plate 316 vibrates upon the deformation of the piezoelectric element 311, the pressure in the corresponding pressure chamber Cv changes, and the ink is thereby ejected from the nozzle N in direction c2.

The housing 318 is a case in which ink to be supplied to the plurality of pressure chambers Cv is accumulated. As illustrated in FIG. 4, in the housing 318 of the present embodiment, a space Rb is formed for each of the first nozzle row L1 and the second nozzle row L2. The space Rb of the housing 318 and the space Ra of the channel substrate 312 communicate with each other. A space constituted by the space Ra and the space Rb functions as a liquid accumulation chamber (reservoir) R that accumulates the ink to be supplied to the plurality of pressure chambers Cv. The ink is supplied to the liquid accumulation chamber R via an inlet 318a formed in the housing 318. The ink in the liquid accumulation chamber R is supplied to the pressure chambers Cv via the supply liquid chamber 312c and the respective supply channels 312a. The vibration absorber 315 is a flexible film (compliance substrate) constituting a wall surface of the liquid accumulation chamber R and absorbs a change in the pressure of the ink in the liquid accumulation chamber R.

The wiring substrate 317 is a plate member in which wires for electrically coupling the driving circuit 340 and the plurality of piezoelectric elements 311 are formed. The vibrating plate 316 is coupled via a plurality of conductive bumps T to a surface of the wiring substrate 317 which faces direction c2. On the other hand, the driving circuit 340 is mounted on a surface of the wiring substrate 317 which faces direction c1.

The driving circuit 340 is an IC (integrated circuit) chip that outputs the driving signal for driving each of the piezoelectric elements 311 and a reference voltage. Specifically, the driving circuit 340 switches between supplying and not supplying the driving signal Com as the driving pulse PD to each of the plurality of piezoelectric elements 311 in accordance with control of the control device 600.

Although not illustrated, an end of an external wire that is electrically coupled to the control device 600 is bonded to the surface of the wiring substrate 317 which faces direction c1. The external wire is constituted by, for example, a coupling component such as an FPC (flexible printed circuit) or an FFC (flexible flat cable). Note that the wiring substrate 317 may be an FPC, an FFC, or the like.

Figure 5:
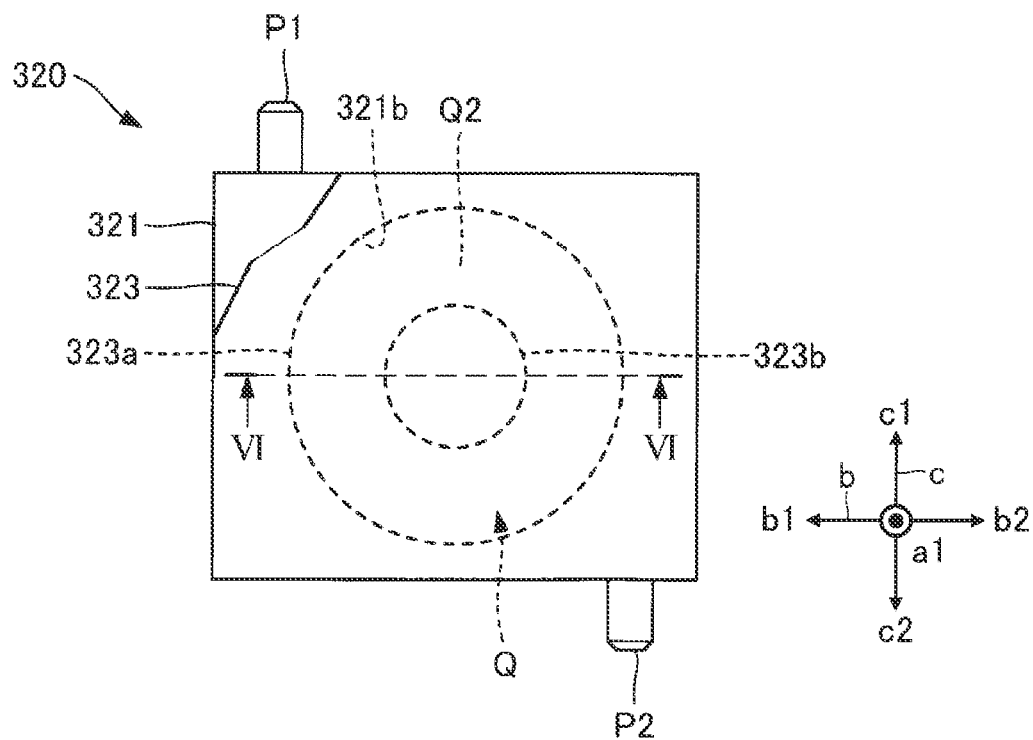
FIG. 5 is a plan view illustrating an example of a configuration of a pressure control valve in the first embodiment.
Figure 6:
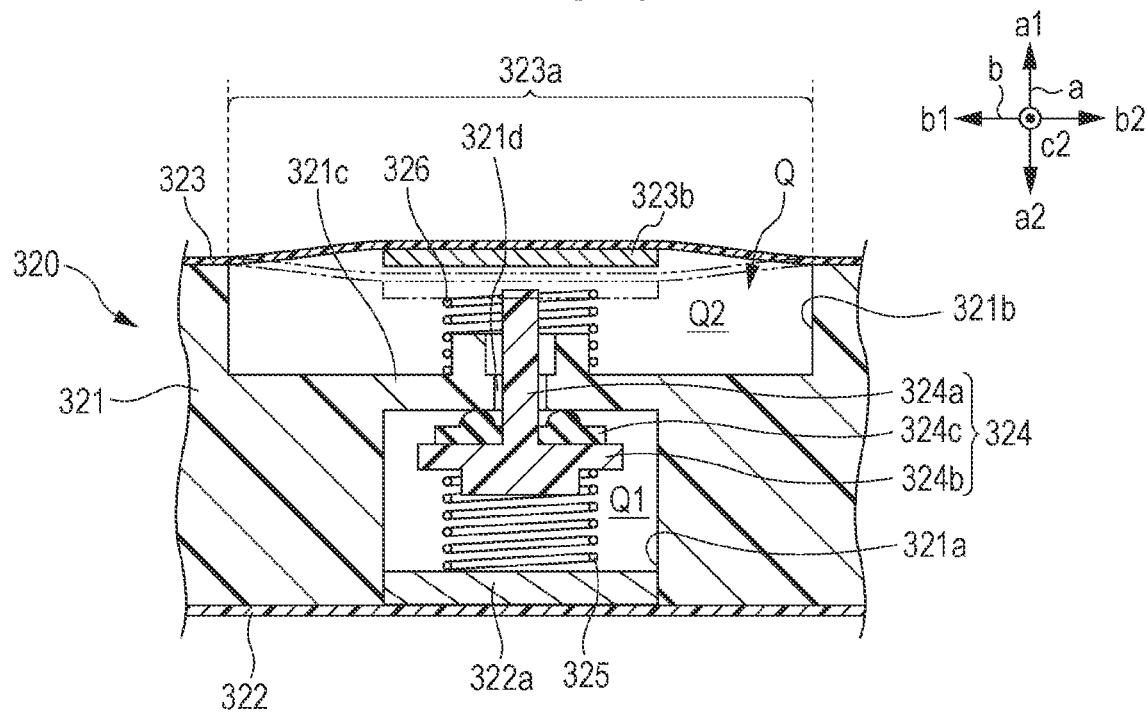
FIG. 6 is a sectional view along line VI-VI in FIG. 5.

FIG. 5 is a plan view illustrating an example of a configuration of the pressure control valve 320 in the first embodiment. FIG. 6 is a sectional view along line VI-VI in FIG. 5. The pressure control valve 320 is a valve mechanism that opens/closes in accordance with the pressure of the ink in the liquid ejecting head 310. With the open/close operation, the pressure of the ink in the liquid ejecting head 310 is kept at a negative pressure within a given range. This stabilizes the meniscus of the ink, which is formed in the nozzle N of the liquid ejecting head 310. As a result, air bubbles are prevented from entering the nozzle N, and ink is prevented from spilling from the nozzle N.

As illustrated in FIG. 6, the pressure control valve 320 includes a channel member 321, a sealing member 322, a sealing member 323, a valve body 324, an urging member 325, and an urging member 326.

The channel member 321 is a structure having a channel Q that enables the upstream channel 510 and the downstream channel 520 of the supply channel 500 described above to communicate with each other. The channel member 321 is formed from, for example, a resin material such as polypropylene and is formed by injection molding or the like. As illustrated in FIG. 5, a supply port P1 and a discharge port P2 are provided in the channel member 321. The supply port P1 and the discharge port P2 communicate with each other via the channel Q. The upstream channel 510 is coupled to the supply port P1. The downstream channel 520 is coupled to the discharge port P2.

As illustrated in FIG. 6, the channel Q has an upstream liquid chamber Q1 and a downstream liquid chamber Q2. The upstream liquid chamber Q1 is a space communicating with the supply port P1 described above via a channel (not illustrated). On the other hand, the downstream liquid chamber Q2 is a space communicating with the discharge port P2 described above via a channel (not illustrated).

In the example illustrated in FIGS. 5 and 6, an external shape of the channel member 321 is substantially plate shaped with the thickness direction in direction a1 or direction a2, and the upstream liquid chamber Q1 and the downstream liquid chamber Q2 are arrayed in the thickness direction of the channel member 321. Here, a recess 321a in which the upstream liquid chamber Q1 is formed is provided on a surface of the channel member 321 which faces direction a2. On the other hand, a recess 321b in which the downstream liquid chamber Q2 is formed is provided on a surface of the channel member 321 which faces direction a1.

The upstream liquid chamber Q1 and the downstream liquid chamber Q2 each have a circular shape when viewed in plan view in direction a1 or direction a2. In the example illustrated in FIG. 6, the area of the downstream liquid chamber Q2 in plan view is larger than the area of the upstream liquid chamber Q1 in plan view. Note that shapes, sizes, or the like of the upstream liquid chamber Q1 and the downstream liquid chamber Q2 are not limited to the example illustrated in FIGS. 5 and 6 and may be any shapes, sizes, or the like.

A valve seat 321c is provided between the upstream liquid chamber Q1 and the downstream liquid chamber Q2 of the channel member 321. The valve seat 321c is a partition wall that separates the upstream liquid chamber Q1 and the downstream liquid chamber Q2 and constitutes a bottom of each of the recess 321b and the recess 321a described above. In other words, the valve seat 321c divides the channel Q into the upstream liquid chamber Q1 and the downstream liquid chamber Q2. The valve seat 321c includes a hole 321d. The hole 321d extends in direction a1 or direction a2 and enables the upstream liquid chamber Q1 and the downstream liquid chamber Q2 to communicate with each other.

The sealing member 322 is a member bonded to the channel member 321 by fusion, adhesion, or the like so as to close an opening of the recess 321a described above. The sealing member 322 is formed from, for example, a resin material such as polypropylene (PP) or polyphenylene sulfide (PPS). The sealing member 322 has a portion 322a constituting a portion of a wall surface of the upstream liquid chamber Q1. The rigidity of the portion 322a is higher than the rigidity of the sealing member 322. The portion 322a desirably has rigidity to an extent in which the portion 322a does not substantially deform due to a change in the pressure of the ink in the upstream liquid chamber Q1.

The sealing member 323 is a sheet member bonded to the channel member 321 by fusion, adhesion, or the like so as to close an opening of the recess 321b described above. The sealing member 323 is formed from, for example, a resin material such as polypropylene (PP) or polyphenylene sulfide (PPS). The sealing member 323 has a flexible section 323a constituting a portion of a wall surface of the downstream liquid chamber Q2. The flexible section 323a has flexibility to flexurally deform in accordance with the pressure of the ink in the downstream liquid chamber Q2.

Here, the flexible section 323a separates a space that is open to the atmosphere and the downstream liquid chamber Q2, and when the pressure of the ink in the downstream liquid chamber Q2 becomes less than atmospheric pressure, a force directed to the downstream liquid chamber Q2 is applied to the flexible section 323a. In the example illustrated in FIG. 6, a pressure receiving plate 323b is provided in the center of the flexible section 323a. The pressure receiving plate 323b is formed from, for example, a resin material such as polypropylene (PP) or polyphenylene sulfide (PPS). Note that the pressure receiving plate 323b may be formed to be integrated with the flexible section 323a or may be formed separately from the flexible section 323a. The pressure receiving plate 323b may be provided as needed, may be fixed to the valve body 324, or may be omitted.

The valve body 324 includes a shaft section 324a, a flange section 324b, and a sealing section 324c. The shaft section 324a and the flange section 324b are each formed from, for example, a resin material such as polypropylene (PP) or polyphenylene sulfide (PPS) and are integrally formed by injection molding or the like.

The shaft section 324a extends in direction a1 or direction a2 and is inserted into the hole 321d. The width of the shaft section 324a is narrower than the width of the hole 321d. Thus, the shaft section 324a is able to move in direction a1 or direction a2, and a gap that enables ink to flow is formed between the outer peripheral surface of the shaft section 324a and the inner peripheral surface of the hole 321d. An end of the shaft section 324a in direction a1 is arranged in the downstream liquid chamber Q2 and is in contact with the pressure receiving plate 323b. On the other hand, an end of the shaft section 324a in direction a2 is arranged in the upstream liquid chamber Q1.

The flange section 324b is provided in the end of the shaft section 324a in direction a2 and is arranged in the upstream liquid chamber Q1. The width of the flange section 324b is wider than the width of the hole 321d and is narrower than the width of the upstream liquid chamber Q1 or the width of the recess 321a. Since the width of the flange section 324b is wider than the width of the hole 321d, the sealing section 324c is able to be interposed between the flange section 324b and the valve seat 321c. Since the width of the flange section 324b is narrower than the width of the recess 321a, the flange section 324b is able to move in direction a1 or direction a2, and a gap that enables ink to flow is formed between the outer peripheral surface of the flange section 324b and the inner peripheral surface of the recess 321a.

The sealing section 324c is arranged on the surface of the flange section 324b such that the sealing section 324c has a portion interposed between the valve seat 321c and the flange section 324b. The sealing section 324c is an elastic member and is formed from a rubber material or an elastomer material of a silicon type, a fluorine type, or the like.

The urging member 325 is an elastic body that is arranged in the upstream liquid chamber Q1 and that urges the valve body 324 toward the valve seat 321c. In other words, the valve body 324 is energized toward the valve seat 321c by the urging member 325. In the example illustrated in FIG. 6, the urging member 325 is a coil spring and is arranged between the valve body 324 and the sealing member 322 while being in a compressively deformed state. Note that the width of the coil spring is fixed in the example illustrated in FIG. 6 but is not limited thereto and may increase from one end to the other end, for example. Moreover, the urging member 325 is not limited to the coil spring as long as the urging member 325 is able to urge the valve body 324 toward the valve seat 321c and may be, for example, a plate spring.

The urging member 326 is an elastic body that is arranged in the downstream liquid chamber Q2 and that adjusts flexural deformability of the flexible section 323a. In the example illustrated in FIG. 6, the urging member 326 is a coil spring and is arranged between the valve seat 321c and the pressure receiving plate 323b. Note that the width of the coil spring is fixed in the example illustrated in FIG. 6 but is not limited thereto and may increase from one end to the other end, for example. Moreover, the urging member 326 is not limited to the coil spring and may be, for example, a plate spring. The urging member 326 may be provided as needed or may be omitted.

In the pressure control valve 320 described above, in a normal state in which the pressure of the ink in the downstream liquid chamber Q2 is kept at a negative pressure within a given range, the sealing section 324c closely adheres to the valve seat 321c by receiving an urging force from the urging member 325, and the upstream liquid chamber Q1 and the downstream liquid chamber Q2 are thereby isolated. That is, the channel Q closes in the normal state.

On the other hand, when the negative pressure of the ink in the downstream liquid chamber Q2 increases to a predetermined value or more due to, for example, ejection of the ink by the liquid ejecting head 310, the pressure receiving plate 323b enables the valve body 324 to be displaced against the urging force of the urging member 325 and the urging member 326 while the flexible section 323a flexurally deforms as indicated by a two-dot chain line in FIG. 6. As a result, a gap is formed between the sealing section 324c and the valve seat 321c, and the upstream liquid chamber Q1 and the downstream liquid chamber Q2 thereby communicate with each other via the hole 321d. That is, the channel Q opens.

When the channel Q opens, the ink in the liquid accumulation section 400 is supplied from the upstream liquid chamber Q1 to the downstream liquid chamber Q2 via the hole 321d. Upon the supply, the negative pressure of the ink in the downstream liquid chamber Q2 decreases. As a result, the sealing section 324c closely adheres to the valve seat 321c again by receiving an urging force from the urging member 325, and the upstream liquid chamber Q1 and the downstream liquid chamber Q2 are thereby isolated. When the pressure control valve 320 opens/closes in accordance with the pressure of the ink in the liquid ejecting head 310 as described above, the pressure of the ink in the downstream liquid chamber Q2 is kept at a negative pressure within a given range.

1-4. Operation of Three-Dimensional-Object Printing Apparatus

Figure 7:
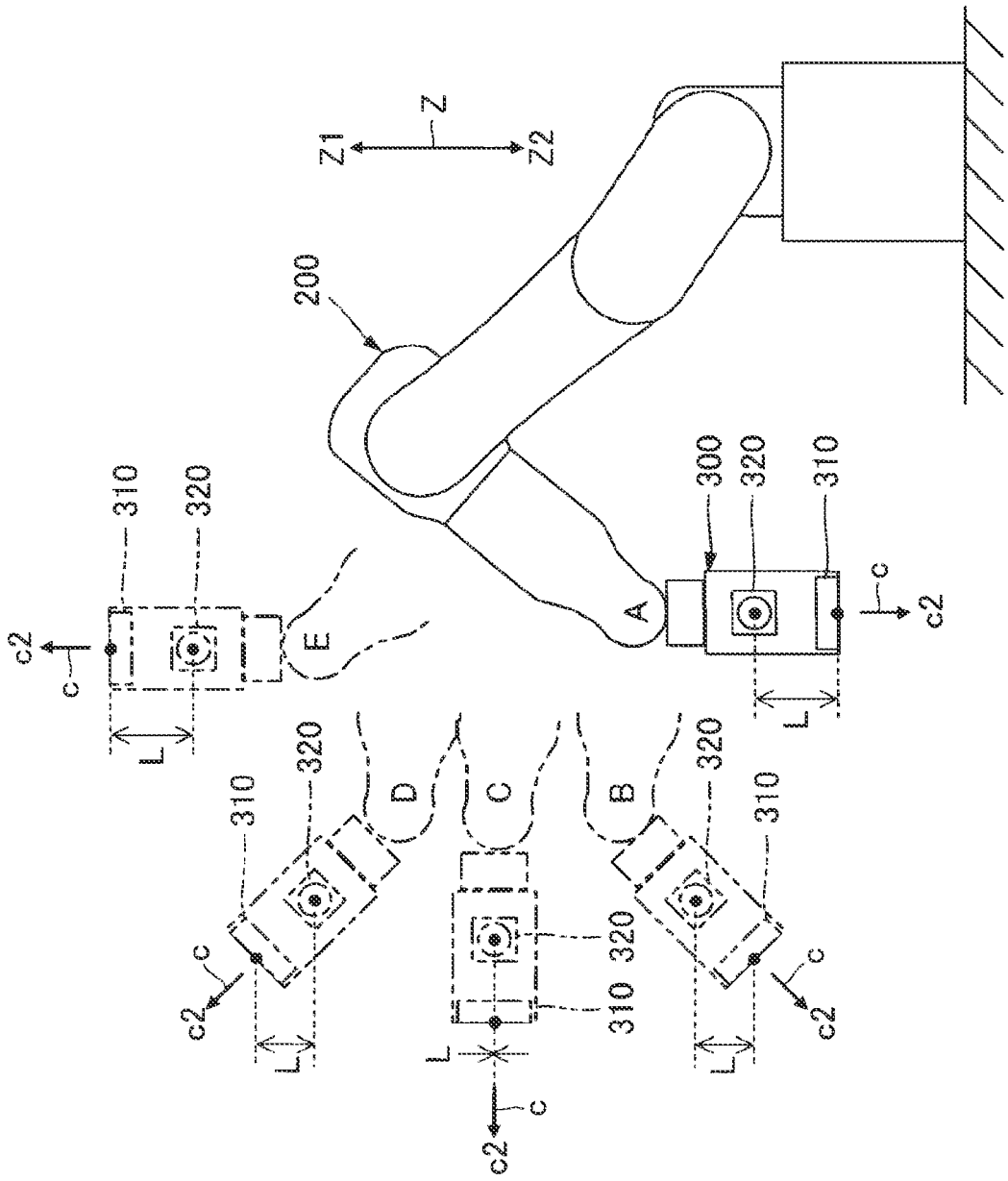
FIG. 7 is a view for explaining a change in a positional relationship between the liquid ejecting head and the pressure control valve.

FIG. 7 is a view for explaining a change in a positional relationship between the liquid ejecting head 310 and the pressure control valve 320. As illustrated in FIG. 7, direction c2 which is a direction from the pressure control valve 320 to the liquid ejecting head 310 can change. That is, the nozzle surface F of the liquid ejecting head 310 can be brought into not only a state of being parallel to the horizontal plane but also a state of being inclined relative to the horizontal plane. Note that FIG. 7 exemplifies an instance in which the position of the liquid ejecting head 310 is defined as the center position of the liquid ejecting head 310. Similarly, FIG. 7 exemplifies an instance in which the position of the pressure control valve 320 is defined as the center position of the pressure control valve 320.

FIG. 7 illustrates a plurality of representative states A, B, C, D, and E in which the liquid ejecting head unit 300 is oriented differently. Note that, although the position of the liquid ejecting head unit 300 varies between the states A, B, C, D, and E, the following description is similarly applicable to an instance in which the position of the liquid ejecting head unit 300 is the same in the states A, B, C, D, and E. Further, FIG. 7 exemplifies an instance in which an array direction of the plurality of nozzles N crosses or is inclined relative to the horizontal plane, but the array direction may be parallel to the horizontal plane. When the array direction is parallel to the horizontal plane, there is an advantage in that it is difficult for a pressure difference to be generated between the nozzles N.

In the state A indicated by a solid line in FIG. 7, direction c2 extends in direction Z2, that is, downward in the up-down direction. In the state B indicated by a two-dot chain line in FIG. 7, direction c2 extends in a direction in which an angle formed by direction c2 and direction Z2 is 45°. In the state C indicated by a two-dot chain line in FIG. 7, direction c2 extends in a direction in which an angle formed by direction c2 and direction Z2 is 90°; that is, direction c2 extends in a horizontal direction. In the state D indicated by a two-dot chain line in FIG. 7, direction c2 extends in a direction in which an angle formed by direction c2 and direction Z2 is 135°. In the state E indicated by a two-dot chain line in FIG. 7, direction c2 extends in direction Z1 which is a direction in which an angle formed by direction c2 and direction Z2 is 180°, that is, upward in the up-down direction.

In each of the states A and B, the liquid ejecting head 310 is positioned below the pressure control valve 320 in the up-down direction. Note that a distance L between the center of the liquid ejecting head 310 and the center of the pressure control valve 320 in the up-down direction in the state B is less than the distance L between the center of the liquid ejecting head 310 and the center of the pressure control valve 320 in the up-down direction in the state A. Thus, the pressure of the ink in the liquid ejecting head 310 in the state B is less than the pressure of the ink in the liquid ejecting head 310 in the state A. That is, the negative pressure of the ink in the liquid ejecting head 310 in the state B is greater than the negative pressure of the ink in the liquid ejecting head 310 in the state A.

In the state C, the liquid ejecting head 310 and the pressure control valve 320 have the same position in the up-down direction. Thus, the pressure of the ink in the liquid ejecting head 310 in the state C is less than the pressure of the ink in the liquid ejecting head 310 in each of the states A and B. That is, the negative pressure of the ink in the liquid ejecting head 310 in the state C is greater than the negative pressure of the ink in the liquid ejecting head 310 in each of the states A and B.

In each of the states D and E, the liquid ejecting head 310 is positioned above the pressure control valve 320 in the up-down direction. Thus, the pressure of the ink in the liquid ejecting head 310 in each of the states D and E is less than the pressure of the ink in the liquid ejecting head 310 in each of the states A, B, and C. That is, the negative pressure of the ink in the liquid ejecting head 310 in each of the states D and E is greater than the negative pressure of the ink in the liquid ejecting head 310 in each of the states A, B, and C.

The distance L between the center of the liquid ejecting head 310 and the center of the pressure control valve 320 in the up-down direction in the state E is greater than the distance L between the center of the liquid ejecting head 310 and the center of the pressure control valve 320 in the up-down direction in the state D. Thus, the pressure of the ink in the liquid ejecting head 310 in the state E is less than the pressure of the ink in the liquid ejecting head 310 in the state D. That is, the negative pressure of the ink in the liquid ejecting head 310 in the state E is greater than the negative pressure of the ink in the liquid ejecting head 310 in the state D.

Here, as can be seen from FIG. 7, in the present embodiment, a change in the distance L between the states A, B, C, D, and E is relatively small. Thus, a deviation in ejection characteristics between the states A, B, C, D, and E is not large.

Figure 13:
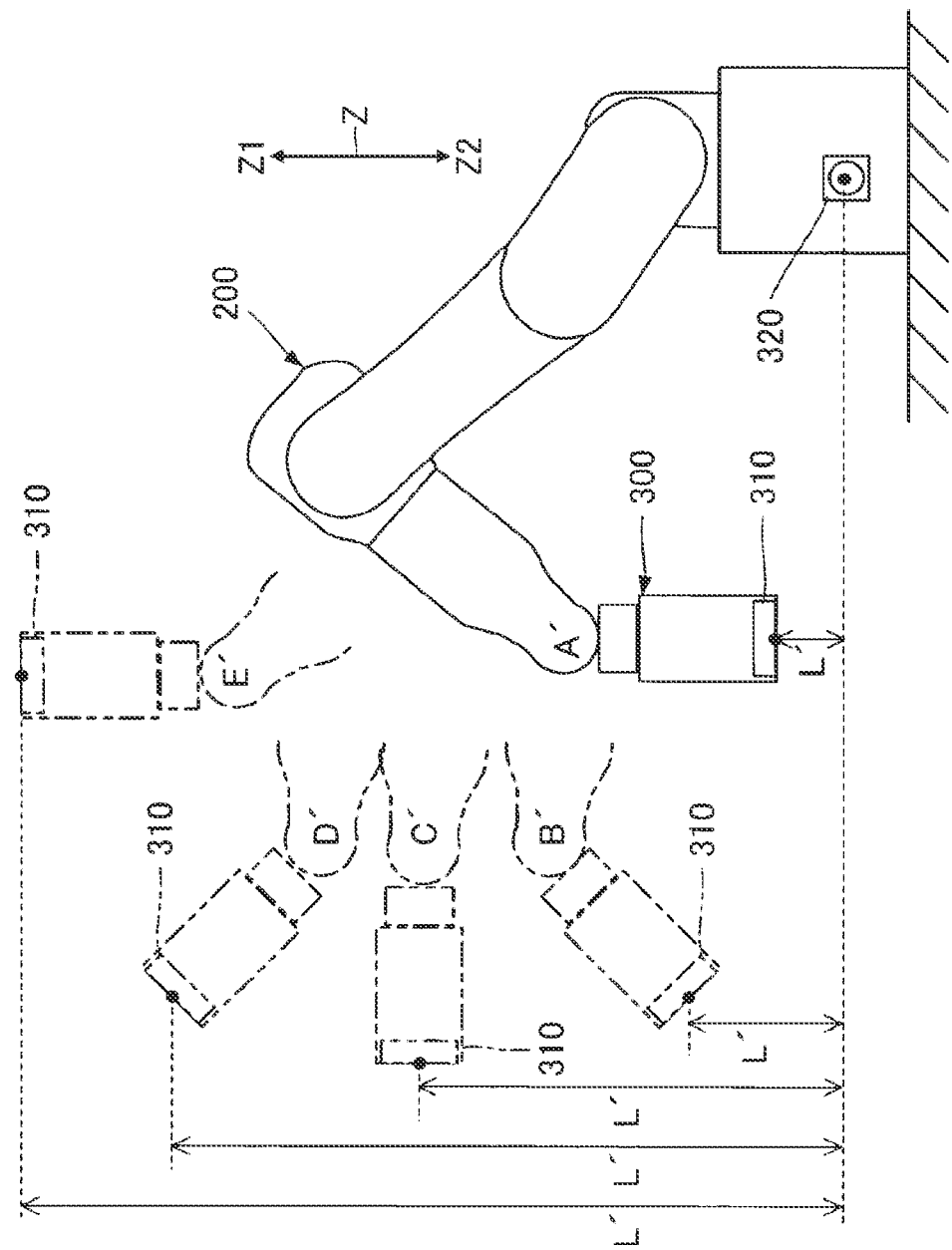
FIG. 13 is a view for explaining a change in a positional relationship between the liquid ejecting head and the pressure control valve in a comparative example.

FIG. 13 is a view for explaining a change in the positional relationship between the liquid ejecting head 310 and the pressure control valve 320 in a comparative example. Note that states A', B', C', D', and E' illustrated in FIG. 13 are respectively provided in the same manner as the states A, B, C, D, and E illustrated in FIG. 7.

In the comparative example illustrated in FIG. 13, the pressure control valve 320 is provided in the base 210. Thus, as can be seen from comparison between FIGS. 13 and 7, a change in a distance L' between the states A', B', C', D', and E' is greater than the change in the distance L between the states A, B, C, D, and E. Thus, in the comparative example, a deviation in ejection characteristics between the states A', B', C', D', and E' is large.

As described above, the three-dimensional-object printing apparatus 100 includes the base 210, the arm 220, the liquid ejecting head 310, the liquid accumulation section 400, the supply channel 500, and the pressure control valve 320. Here, as described above, the arm 220 is supported by the base 210 and includes the joint sections 231 to 236 that are examples of N (N≥1) movable sections that change an angle of the liquid ejecting head 310 with respect to the horizontal plane. The liquid ejecting head 310 is fixed to the tip end of the arm 220 and ejects the ink which is an example of the liquid onto the work piece W. The liquid accumulation section 400 accumulates the ink. The supply channel 500 enables the liquid accumulation section 400 and the liquid ejecting head 310 to communicate with each other and supplies the ink from the liquid accumulation section 400 to the liquid ejecting head 310. The pressure control valve 320 is fixed to the arm 220, is provided halfway in the supply channel 500, and controls the pressure of the ink supplied to the liquid ejecting head 310. Here, K (1≤K≤N) joint sections 231 to 236 are provided between the pressure control valve 320 and the base 210.

In the three-dimensional-object printing apparatus 100 described above, since the pressure control valve 320 is provided halfway in the supply channel 500, the pressure of the ink in the liquid ejecting head 310 is controlled by the pressure control valve 320 to be within a given range regardless of the positional relationship between the liquid ejecting head 310 and the liquid accumulation section 400 in the up-down direction. Thus, compared with a configuration in which no pressure control valve 320 is provided, it is possible to reduce a change in the pressure of the ink in the liquid ejecting head 310 caused by driving of the arm 220.

Further, since the pressure control valve 320 is fixed to the arm 220, compared with a configuration in which the positional relationship between the pressure control valve 320 and the base 210 is fixed, it is possible to reduce a change in water head difference between the ink in the liquid ejecting head 310 and the ink in the pressure control valve 320. Accordingly, this also makes it possible to reduce a change in the pressure of the ink in the liquid ejecting head 310 caused by driving of the arm 220.

As a result, in the three-dimensional-object printing apparatus 100, it is possible to suitably reduce a change in ejection characteristics of the ink in the liquid ejecting head 310 due to a change in the pressure of the ink in the liquid ejecting head 310 caused by driving of the arm 220. Thus, in the three-dimensional-object printing apparatus 100 of the present embodiment, compared with a configuration in which no pressure control valve 320 is provided or a configuration in which the pressure control valve 320 is arranged in the base 210 as in the comparative example described above, the liquid ejecting head 310 is able to stably eject the ink, thus achieving higher printing quality.

In the present embodiment, the number N of joint sections 231 to 236 is six. Here, all six of the joint sections 231 to 236 are arranged between the pressure control valve 320 and the base 210 along the arm 220. When the number is K (K≥(N/2)), there is an advantage in that a change in water head difference between the ink in the liquid ejecting head 310 and the ink in the pressure control valve is easily reduced compared with a configuration in which K is less than (N/2).

In particular, in the present embodiment, the liquid ejecting head 310 is fixed to the tip end of the arm 220, K=N, and it is therefore possible to fix the positional relationship between the liquid ejecting head 310 and the pressure control valve 320 regardless of the orientation of the arm 220. Note that, in a multi-axis robot such as a six-axis robot like the robot 200, even when an end effector does not change in position or orientation, the arm 220 can be located in a plurality of orientations in some instances. Thus, even when K<N, by selecting an orientation in which a change in the positional relationship between the liquid ejecting head 310 and the pressure control valve 320 is small from the plurality of orientations, it is possible to reduce a change in water head difference between the ink in the liquid ejecting head 310 and the ink in the pressure control valve 320. However, when K=N, regardless of whether or not the arm 220 can be located in multiple orientations, there is an advantage in that the positional relationship between the liquid ejecting head 310 and the pressure control valve 320 is fixed.

Moreover, as described above, the supply channel 500 includes the upstream channel 510 that enables the liquid accumulation section 400 and the pressure control valve 320 to communicate with each other and the downstream channel 520 that enables the pressure control valve 320 and the liquid ejecting head 310 to communicate with each other. The pressure control valve 320 includes the upstream liquid chamber Q1 coupled to the upstream channel 510, the downstream liquid chamber Q2 coupled to the downstream channel 520, the valve body 324 that opens/closes between the upstream liquid chamber Q1 and the downstream liquid chamber Q2, the flexible section 323a that constitutes a portion of an inner wall of the downstream liquid chamber Q2 and has flexibility, and the urging members 325 and 326 that urge the flexible section 323a in a direction in which the downstream liquid chamber Q2 capacity increases. By opening/closing in accordance with the negative pressure of the downstream liquid chamber Q2, such a pressure control valve 320 keeps the pressure of the ink supplied to the liquid ejecting head 310 in a predetermined negative pressure state.

Here, the length of the downstream channel 520 is shorter than the length of the upstream channel 510. Thus, compared with a configuration in which the length of the downstream channel 520 is longer than the length of the upstream channel 510, it is possible to easily enhance accuracy in controlling the pressure of the ink in the liquid ejecting head 310 by the pressure control valve 320. Further, when the length of the upstream channel 510 is longer than the length of the downstream channel 520, it is possible to improve flexibility in setting a position at which the liquid accumulation section 400 is installed compared with a configuration in which the length of the upstream channel 510 is shorter than the length of the downstream channel 520. Note that the length of the downstream channel 520 corresponds to the length of the supply channel 500 between the pressure control valve 320 and the liquid ejecting head 310. The length of the upstream channel 510 corresponds to the length of the supply channel 500 between the pressure control valve 320 and the liquid accumulation section 400.

Moreover, as described above, the liquid accumulation section 400 is arranged at a position above the movement region of the liquid ejecting head 310 in the up-down direction. Thus, the pressure of the ink, which is applied from the liquid accumulation section 400 to the pressure control valve 320, is higher than the pressure of the ink in the liquid ejecting head 310. Accordingly, a difference in the pressure enables the ink to be supplied from the liquid accumulation section 400 to the liquid ejecting head 310 via the pressure control valve 320.

Moreover, as described above, the arm 220 includes the arms 221 to 226. Here, of the arms 221 to 226, the arm 226 to which the liquid ejecting head 310 is fixed is an example of a first arm. The arm 225 that supports the arm 226 so as to be pivotable about the sixth pivot axis O6 is an example of a second arm. As described above, the liquid ejecting head 310 has the nozzle surface F on which the nozzles N for ejecting the ink are provided, and the sixth pivot axis O6 overlaps the nozzle surface F in the direction extending along the sixth pivot axis O6. Thus, compared with a configuration in which the sixth pivot axis O6 does not overlap the nozzle surface F in the aforementioned direction, even when the liquid ejecting head 310 pivots about the sixth pivot axis, it is possible to suppress the moment of the pivot from affecting ejection characteristics of the liquid ejecting head 310.

Moreover, as described above, the liquid ejecting head 310 includes the first nozzle row L1 and the second nozzle row L2 that are each an example of a nozzle row in which the plurality of nozzles N for ejecting the ink are arrayed. Here, a position of at least a portion of the pressure control valve 320 in the array direction of the plurality of nozzles N is between, of the plurality of nozzles N, nozzles N1 and N2 provided in ends in the array direction, as illustrated in FIG. 3. Thus, when the array direction of the plurality of nozzles N is the up-down direction, it is possible to minimize a difference in the pressure between the ink in the nozzles N and the ink in the pressure control valve 320.

Moreover, the flexible section 323a is formed so as to expand in a direction not crossing the array direction of the plurality of nozzles N. Thus, compared with a configuration in which the flexible section 323a is formed so as to expand in a direction crossing the array direction, it is possible to reduce the liquid ejecting head unit 300 in size and thickness, and it is possible to perform printing on a narrow region of a work piece or the like, which is formed into, for example, a recess, without bringing the liquid ejecting head unit 300 into contact with the work piece.

2. Second Embodiment

A second embodiment of the disclosure will be described below. In an aspect exemplified below, elements having an effect and a function that are similar to those of the first embodiment will be given reference numerals used in the description of the first embodiment, and detailed description thereof will be omitted as appropriate.

In the example illustrated in FIG. 7 described above, the states are arranged in order of A, B, C, D, and E when being arranged in an ascending order of the negative pressure of the ink in the liquid ejecting head 310. Thus, the states are arranged in order of A, B, C, D, and E when being arranged in a descending order of easiness of ejection of the ink from the liquid ejecting head 310. Thus, in the present embodiment, different driving signals Com are used in the states A, B, C, D, and E.

Figure 8:
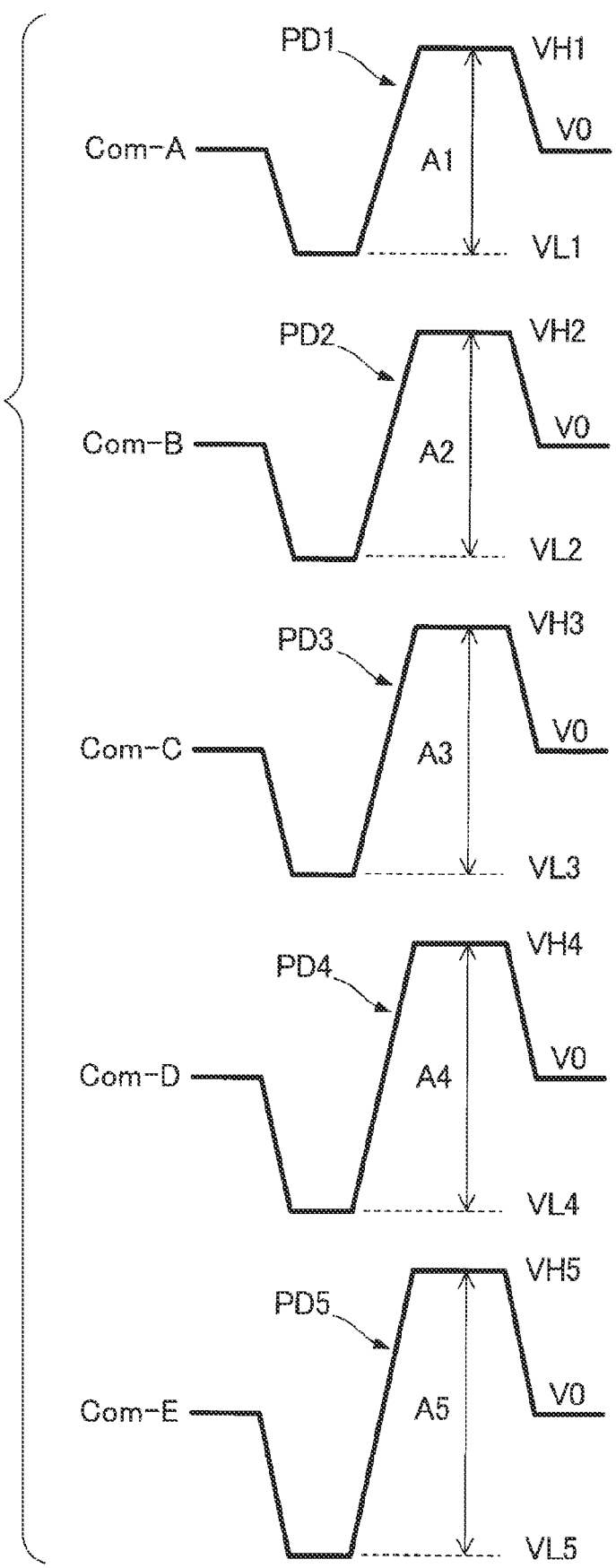
FIG. 8 illustrates an example of a plurality of driving signals including different driving pulses.

FIG. 8 illustrates an example of a plurality of driving signals Com-A to Com-E including different driving pulses. FIG. 8 exemplifies an instance in which the driving signal generation circuit 640 generates the signal while switching between the plurality of driving signals Com-A to Com-E that differ from each other in amplitude by changing an amplification factor of the aforementioned amplification circuit of the driving signal generation circuit 640. Note that waveforms of the driving signals Com-A to Com-E are examples and are not limited thereto.

Specifically, the driving signal Com-A is generated by the driving signal generation circuit 640 as the driving signal Com in the state A described above. The driving signal Com-A includes a driving pulse PD1 that drops to a potential VL1 from a reference potential V0 and then rises to a potential VH1 higher than the reference potential V0. Here, a difference between the potential VL1 and the potential VH1 is an amplitude A1 of the driving pulse PD1.

The driving signal Com-B is generated by the driving signal generation circuit 640 as the driving signal Com in the state B described above. The driving signal Com-B includes a driving pulse PD2 that drops to a potential VL2 from the reference potential V0 and then rises to a potential VH2 higher than the reference potential V0. Here, a difference between the potential VL2 and the potential VH2 is an amplitude A2 of the driving pulse PD2. The amplitude A2 is greater than the amplitude A1 described above.

The driving signal Com-C is generated by the driving signal generation circuit 640 as the driving signal Com in the state C described above. The driving signal Com-C includes a driving pulse PD3 that drops to a potential VL3 from the reference potential V0 and then rises to a potential VH3 higher than the reference potential V0. Here, a difference between the potential VL3 and the potential VH3 is an amplitude A3 of the driving pulse PD3. The amplitude A3 is greater than the amplitude A2 described above.

The driving signal Com-D is generated by the driving signal generation circuit 640 as the driving signal Com in the state D described above. The driving signal Com-D includes a driving pulse PD4 that drops to a potential VL4 from the reference potential V0 and then rises to a potential VH4 higher than the reference potential V0. Here, a difference between the potential VL4 and the potential VH4 is an amplitude A4 of the driving pulse PD4. The amplitude A4 is greater than the amplitude A3 described above.

The driving signal Com-E is generated by the driving signal generation circuit 640 as the driving signal Com in the state E described above. The driving signal Com-E includes a driving pulse PD5 that drops to a potential VL5 from the reference potential V0 and then rises to a potential VH5 higher than the reference potential V0. Here, a difference between the potential VL5 and the potential VH5 is an amplitude A5 of the driving pulse PD5. The amplitude A5 is greater than the amplitude A4 described above.

Figure 9:
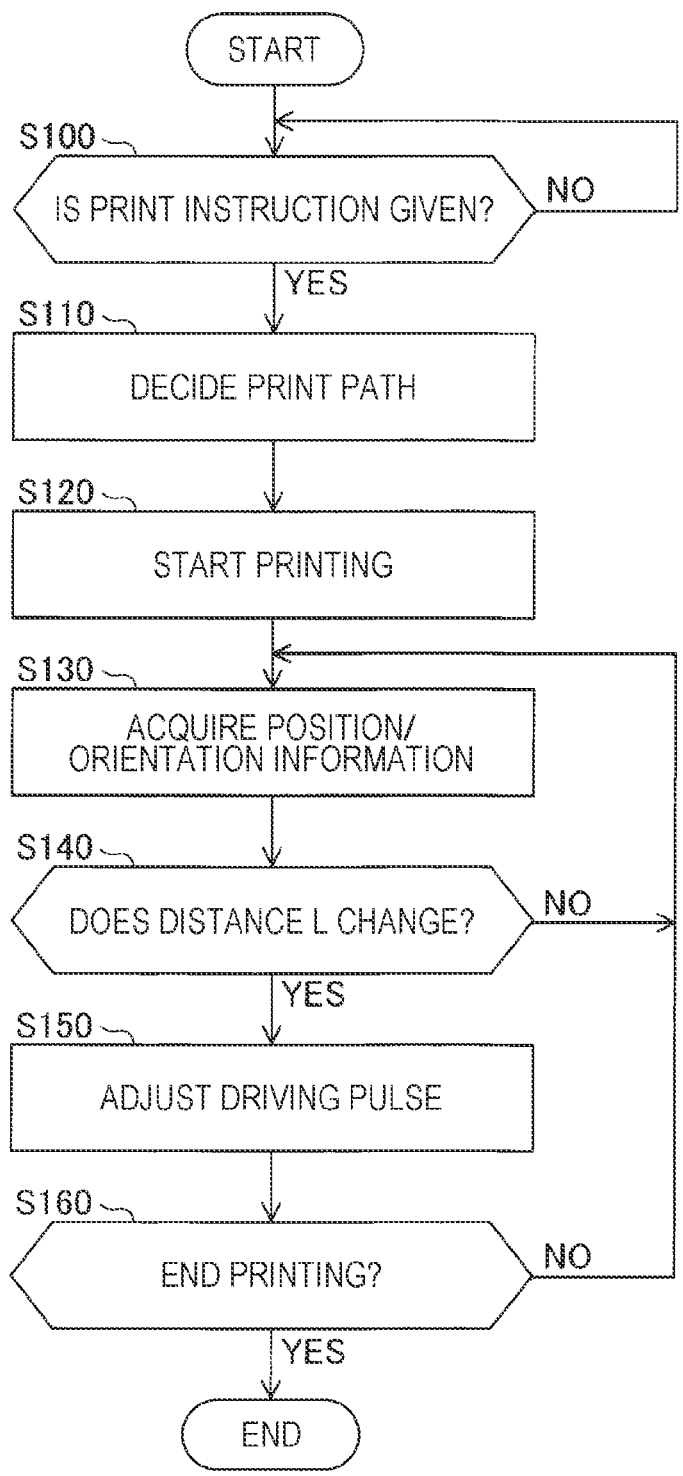
FIG. 9 is a flowchart illustrating operation of a three-dimensional-object printing apparatus according to a second embodiment.

FIG. 9 is a flowchart illustrating operation of the three-dimensional-object printing apparatus 100 according to the second embodiment. As illustrated in FIG. 9, first, at step S100, the three-dimensional-object printing apparatus 100 determines whether or not a print instruction is given. The determination is made based on, for example, whether or not the information acquisition section 611 acquires the print data Img.

Step S100 is repeated until a print instruction is given, and when a print instruction is given, a print path is decided at step S110. The decision is made, for example, by the arm control section 612 deciding the print path as a movement path of the liquid ejecting head 310. At this time, the orientation of the liquid ejecting head 310 in the print path is also decided by the arm control section 612. The print path is not set such that all of the plurality of nozzles N are positioned above the pressure control valve 320 in the up-down direction at the time of starting printing but is set such that the lowermost nozzle N in the up-down direction among the plurality of nozzles N is positioned below the pressure control valve 320 in the up-down direction. Thus, a situation in which the negative pressure of the ink in the liquid ejecting head 310 at the time of starting printing excessively increases is suppressed from occurring. Note that printing starts at a timing at which liquid droplets start to be ejected from a nozzle N while at least a portion of the nozzle surface F of the liquid ejecting head 310 faces a work piece.

Then, printing starts at step S120. That is, at step S120, control of driving of the arm 220 by the arm control section 612 and control of driving of the liquid ejecting head 310 by the ejection control section 613 are performed based on information from the information acquisition section 611.

Next, at step S130, position/orientation information about the position and the orientation of the liquid ejecting head 310 is acquired. The acquisition is performed by, for example, the information acquisition section 611 acquiring the information D1 from the arm driving mechanism 230 as the position/orientation information.

Next, at step S140, whether or not the distance L described above changes is determined. The determination is made by, for example, the information acquisition section 611 calculating the distance L based on the information D1 from the arm driving mechanism 230.

When the distance L does not change, steps S130 and S140 described above are repeated. On the other hand, when the distance L changes, the driving pulse is adjusted at step S150. The adjustment is performed by, for example, the ejection control section 613 changing the amplification factor of the amplification circuit of the driving signal generation circuit 640 based on the information D1 from the arm driving mechanism 230. Here, the amplification factor is changed in a continuous or stepwise manner such that the driving signals Com-A to Com-E are generated in accordance with the states A, B, C, D, and E as described above.

Then, at step S160, whether or not an instruction to end printing is given is determined. When no instruction to end printing is given, steps S130 to S160 described above are repeated. On the other hand, when an instruction to end printing is given, the procedure ends.

In the present embodiment, a position of at least a portion of the valve body 324 in the up-down direction is above the position of the lowermost nozzle N in the up-down direction among the plurality of nozzles N of the liquid ejecting head 310 at the time of starting printing. According to such a position or orientation of the liquid ejecting head 310 at the time of starting printing, there is an advantage in that the ink is readily supplied to the liquid ejecting head 310 stably not only at the time of starting printing but also after start of printing.

Moreover, as described above, the three-dimensional-object printing apparatus 100 includes the information acquisition section 611 that acquires the information D1 about the position and the orientation of the liquid ejecting head 310 and the ejection control section 613 that controls driving of the liquid ejecting head 310 based on the information D1. Therefore, even when the pressure of the ink in the liquid ejecting head 310 changes due to a change in the positional relationship between the liquid ejecting head 310 and the pressure control valve 320 in the up-down direction, it is possible to control driving of the liquid ejecting head 310 so as to offset the change.

Moreover, as described above, the ejection control section 613 drives the liquid ejecting head 310 by using the driving pulse while switching between the driving pulses PD1 to PD5 based on the information D1. Here, one of the driving pulses PD1 to PD5 is an example of a first driving pulse used in a first state. Another one of the driving pulses PD1 to PD5 is an example of a second driving pulse used in a second state. As described above, switching is performed between the first state in which the liquid ejecting head 310 is driven by using the first driving pulse when the orientation of the liquid ejecting head 310 is a first orientation and the second state in which the liquid ejecting head 310 is driven by using the second driving pulse, a waveform of which differs from that of the first driving pulse, when the orientation of the liquid ejecting head 310 is a second orientation which differs from the first orientation. According to such switching of the driving pulse, even when the pressure of the ink in the liquid ejecting head 310 changes due to a change in the positional relationship between the liquid ejecting head 310 and the pressure control valve 320 in the up-down direction, it is possible to control driving of the liquid ejecting head 310 so as to offset the change.

The present embodiment indicates an example in which the print path is set such that the lowermost nozzle N in the up-down direction among the plurality of nozzles N is positioned below the pressure control valve 320 in the up-down direction and in which the driving signal is generated in accordance with the orientation of the liquid ejecting head 310 as in the state A, B, C, D, or E, but both control of setting and control of generation are not necessarily required to be performed and may be individually performed as appropriate in accordance with the shape of the work piece W, a print pattern, or the like.

3. Third Embodiment

A third embodiment of the disclosure will be described below. In an aspect exemplified below, elements having an effect and a function that are similar to those of the first embodiment will be given reference numerals used in the description of the first embodiment, and detailed description thereof will be omitted as appropriate.

Figure 10:
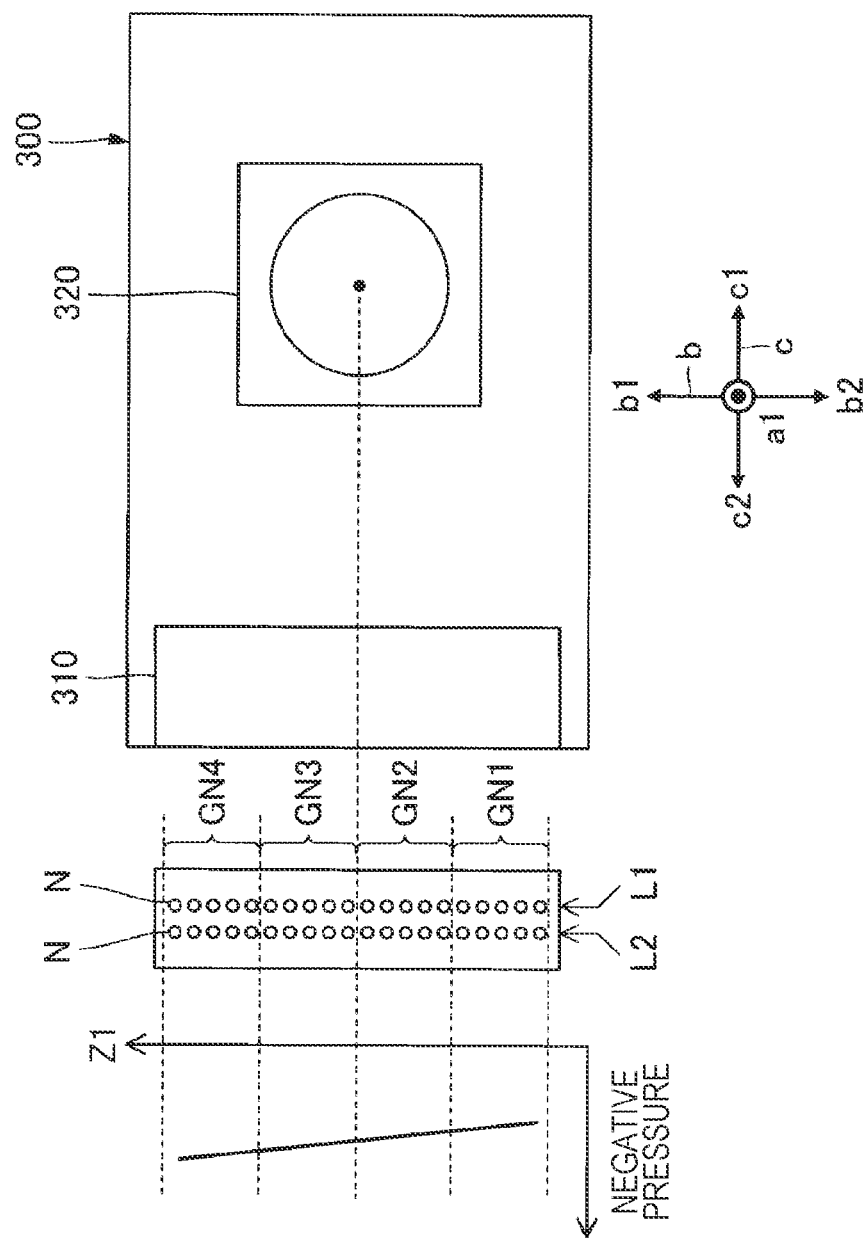
FIG. 10 is a view for explaining distribution of pressure of ink in a nozzle row.

FIG. 10 is a view for explaining distribution of the pressure of the ink in the first nozzle row L1 or the second nozzle row L2. FIG. 10 illustrates a relationship between positions of the nozzles N in direction Z1 and the negative pressure of the ink in the nozzles N when the array direction of the plurality of nozzles N is orthogonal to the horizontal plane. Note that the following description is applicable similarly to an instance in which the array direction of the plurality of nozzles N crosses the horizontal plane in an inclined manner.

As illustrated on the right side in FIG. 10, when the array direction of the plurality of nozzles N crosses the horizontal plane, the nozzles N differ from each other in the negative pressure of the ink as illustrated on the left side in FIG. 10. This is because, for example, the space Ra provided in the liquid ejecting head 310 enables the nozzles N to communicate with each other, and gravity acts such that the ink moves in a direction which is opposite to direction Z1. Here, the negative pressure of the ink in the nozzle N provided at a position in direction Z1 corresponding to the uppermost position in the up-down direction among the plurality of nozzles N is the greatest. Of the others of the plurality of nozzles N, the nozzle N closer to the uppermost position in direction Z1 has greater negative pressure of the ink.

In the present embodiment, the first nozzle row L1 and the second nozzle row L2 are each divided into four nozzle sections GN1, GN2, GN3, and GN4, and different driving signals Com are used for the nozzle sections. That is, the driving pulse is adjusted for each of the nozzle sections based on the orientation of the liquid ejecting head 310 around the c-axis. In the present embodiment, for example, the driving circuit 340 includes a plurality of amplifiers so as to be able to adjust an amplification of the driving pulse for each of the nozzle sections. Note that the number of sections is not limited to the example illustrated in FIG. 10 and may be any number.

Figure 11:
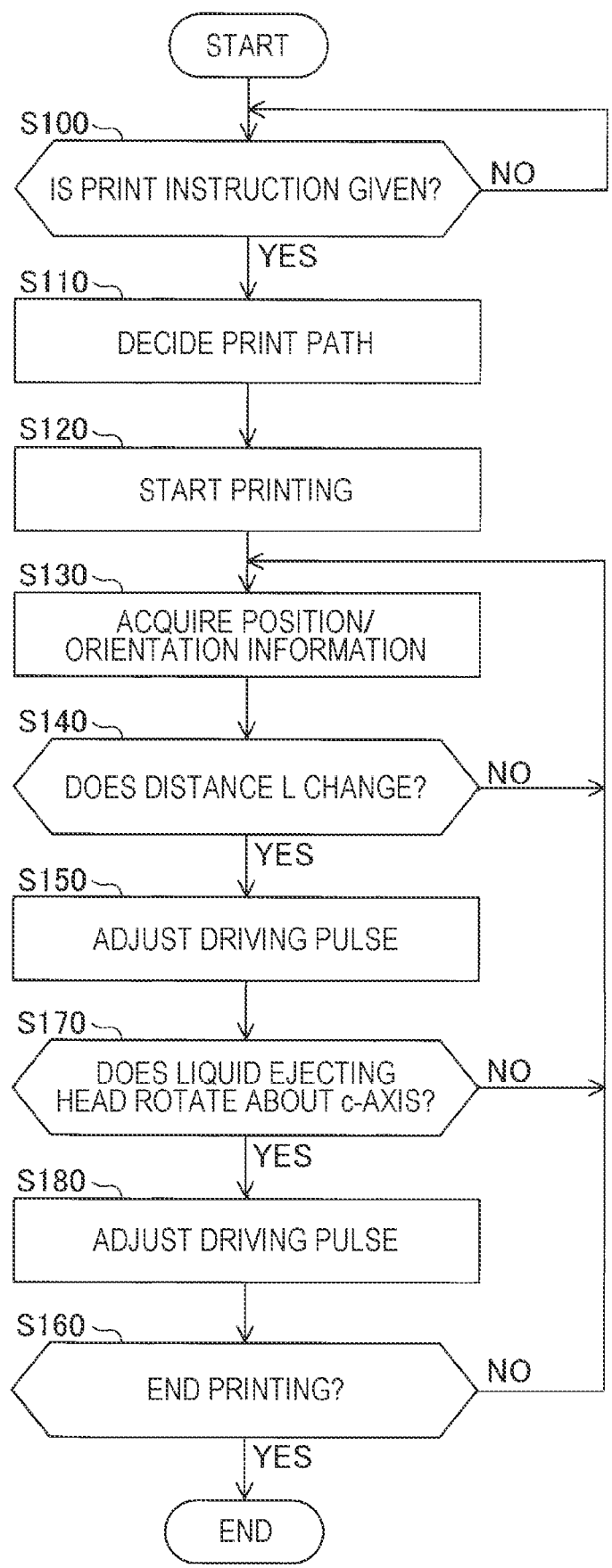
FIG. 11 is a flowchart illustrating operation of a three-dimensional-object printing apparatus according to a third embodiment.

FIG. 11 is a flowchart illustrating operation of a three-dimensional-object printing apparatus according to the third embodiment. In the three-dimensional-object printing apparatus of the present embodiment, steps S100 to S150 are performed similarly to the first embodiment described above, and whether or not the orientation of the liquid ejecting head 310 around the c-axis changes is then determined at step S170. The determination is made by, for example, the information acquisition section 611 based on the information D1 from the arm driving mechanism 230.

When the orientation does not change, steps S130 to S170 described above are repeated. On the other hand, when the orientation changes, the driving pulse is adjusted for each of the nozzle sections at step S180. Step S160 is then performed similarly to the first embodiment described above.

As described above, in the present embodiment, the first nozzle row L1 and the second nozzle row L2 are each divided into the plurality of nozzle sections GN1, GN2, GN3, and GN4. The ejection control section 613 of the present embodiment adjusts, for each of the nozzle sections, the waveform of the driving pulse used for driving of the liquid ejecting head 310 based on the information D1. As described above, the driving pulse used for driving of the liquid ejecting head 310 varies between the nozzle sections. Thus, even when there is a difference in the pressure of the ink between the nozzle sections, it is possible to control driving of the liquid ejecting head 310 so as to offset the difference.

4. Fourth Embodiment

A fourth embodiment of the disclosure will be described below. In an aspect exemplified below, elements having an effect and a function that are similar to those of the first embodiment will be given reference numerals used in the description of the first embodiment, and detailed description thereof will be omitted as appropriate.

Figure 12:
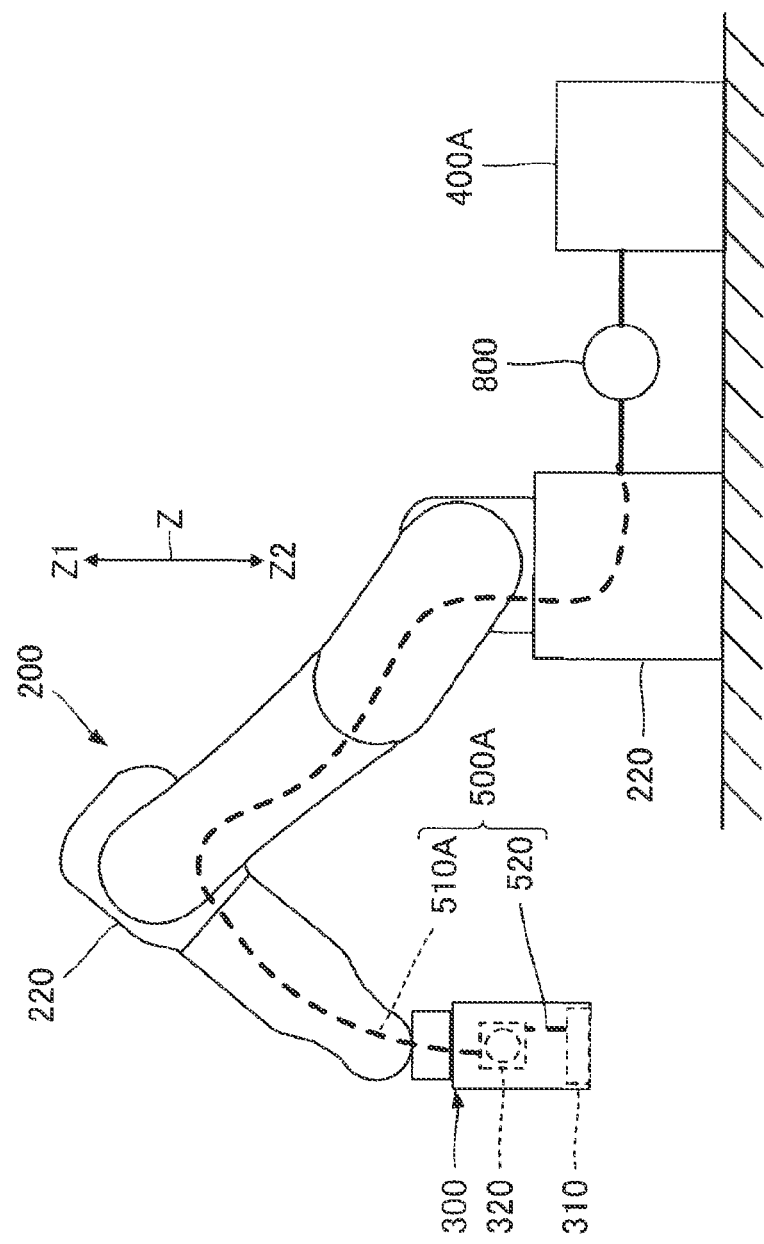
FIG. 12 is a schematic view illustrating a three-dimensional-object printing apparatus according to a fourth embodiment.

FIG. 12 is a schematic view illustrating a three-dimensional-object printing apparatus according to the fourth embodiment. As illustrated in FIG. 12, the three-dimensional-object printing apparatus of the present embodiment is similar to the three-dimension object printing apparatus 100 of the first embodiment described above except that a liquid accumulation section 400A, a supply channel 500A, and a pressurizing mechanism 800 are provided instead of the liquid accumulation section 400 and the supply channel 500. The liquid accumulation section 400A is similar to the liquid accumulation section 400 except for an installation position.

The supply channel 500A is used to supply ink from the liquid accumulation section 400A to the liquid ejecting head 310. The supply channel 500A is divided into an upstream channel 510A and the downstream channel 520 by the pressure control valve 320. The upstream channel 510A is arranged inside the arm 220. When at least a portion of the supply channel 500A is arranged inside the arm 220 as described above, it is possible to suppress the supply channel 500A from being in contact with the work piece W in accordance with operation of the arm 220. Note that the upstream channel 510A is configured by appropriately using, for example, a bendable or pivotable joint in addition to a flexible tubular body.

The pressurizing mechanism 800 is a pump that pressurizes the ink supplied from the liquid accumulation section 400A to the pressure control valve 320. In the example illustrated in FIG. 12, the pressurizing mechanism 800 is provided halfway in the upstream channel 510A. By using such a pressurizing mechanism 800, regardless of the installation position of the liquid accumulation section 400A, the pressure of the ink applied from the liquid accumulation section 400A to the pressure control valve 320 is able to be made greater than the pressure of the ink in the liquid ejecting head 310. Thus, a difference in the pressures enables the ink to be supplied from the liquid accumulation section 400A to the liquid ejecting head 310 via the pressure control valve 320.

5. MODIFIED EXAMPLES

The respective aspects exemplified above can be variously modified. Specific modified aspects applicable to each of the aforementioned aspects will be exemplified below. Any two or more aspects selected from the following examples can be appropriately combined as long as they do not contradict each other.

5-1. Modified Example 1

In the aspects descried above, the configuration in which the pressure control valve is fixed to the arm positioned on the most tip end side among the plurality of arms constituting the robot arm is exemplified, but the configuration is not limited thereto, and the pressure control valve may be fixed to another arm.

5-2. Modified Example 2

In the aspects descried above, the configuration in which the six-axis vertical articulated robot is used is exemplified, but the configuration is not limited thereto. The mechanism that changes the position and the orientation of the liquid ejecting head may be an arm having three or more movable sections and may be, for example, a multi-axis vertical robot other than a six-axis vertical robot or may be a multi-axis horizontal robot. Moreover, the movable section is not limited to a pivot mechanism and may be, for example, an expansion/contraction mechanism.

5-3. Modified Example 3

In the aspects descried above, the configuration in which printing is performed by using one type of ink is exemplified, but the configuration is not limited thereto, and the disclosure is applicable to a configuration in which printing is performed by using two or more types of ink.

5-4. Modified Example 4

The three-dimensional-object printing apparatus of the disclosure is not limited to being used for printing. For example, a three-dimensional-object printing apparatus that ejects a solution of a color material is used as a manufacturing apparatus that forms a color filter of a liquid crystal display device. Moreover, a three-dimensional-object printing apparatus that ejects a solution of a conductive material is used as a manufacturing apparatus that forms a wire or an electrode of a wiring substrate.

What is claimed is:

1. A three-dimensional-object printing apparatus comprising:
   a base;
   an arm supported by the base;
   a liquid ejecting head that is fixed to a tip end of the arm and ejects a liquid onto a work piece;
   a liquid accumulation section that is a container and accumulates the liquid, the liquid accumulation section being provided independent of the arm;
   a supply channel which communicates the liquid accumulation section and the liquid ejecting head each other and along which the liquid is supplied from the liquid accumulation section to the liquid ejecting head;
   a pressure control valve that is provided halfway in the supply channel and controls a pressure of the liquid supplied to the liquid ejecting head, the pressure control valve being fixed to the tip end of the arm; and
   a controller that controls the arm, wherein
   the arm includes N movable sections that change an angle of the liquid ejecting head with respect to a horizontal plane, N being 1 or more,
   K pieces of the movable sections are provided between the pressure control valve and the base, K being N,
   a position of the pressure control valve with respect to the horizontal plane is changed by the K pieces of the movable sections,
   the controller controls the arm to change a position of the liquid ejecting head to a first position in which a nozzle surface of the liquid ejecting head faces the horizontal plane and a second position in which the nozzle surface of the liquid ejecting head is inclined relative to the horizontal plane and a negative pressure of the liquid in the liquid ejecting head is greater than the pressure of liquid in the first position,
   a distance between the liquid ejecting head and the pressure control valve along an arrangement direction of the liquid ejecting head and the pressure control valve is same in the first position and the second position,
   the liquid accumulation section is arranged above a movement region of the liquid ejecting head in a gravity direction,
   the liquid ejecting head is driven by using a first driving pulse when the liquid ejecting head is in the first position,
   the liquid ejecting head is driven by using a second driving pulse, a waveform of which differs from a waveform of the first driving pulse, when the liquid ejecting head is in the second position, and
   an amplitude of the second driving pulse is greater than an amplitude of the first driving pulse.

2. The three-dimensional-object printing apparatus according to claim 1, wherein
   a length of the supply channel between the pressure control valve and the liquid ejecting head is shorter than a length of the supply channel between the pressure control valve and the liquid accumulation section.

3. The three-dimensional-object printing apparatus according to claim 1, wherein
   the supply channel includes
   an upstream channel that communicates the liquid accumulation section and the pressure control valve each other and
   a downstream channel that communicates the pressure control valve and the liquid ejecting head each other, and
   the pressure control valve includes
   an upstream liquid chamber coupled to the upstream channel,
   a downstream liquid chamber coupled to the downstream channel,
   a valve body that opens/closes between the upstream liquid chamber and the downstream liquid chamber,
   a flexible section that constitutes a portion of an inner wall of the downstream liquid chamber and that has flexibility, and
   an urging member that urges the flexible section in a direction in which a downstream liquid chamber capacity increases.

4. The three-dimensional-object printing apparatus according to claim 3, wherein
   the pressure control valve opens/closes in accordance with a negative pressure of the downstream liquid chamber and thereby keeps the pressure of the liquid supplied to the liquid ejecting head in a predetermined negative pressure state.

5. The three-dimensional-object printing apparatus according to claim 1, wherein
   a pressure of the liquid, which is applied from the liquid accumulation section to the pressure control valve, is greater than a pressure of the liquid in the liquid ejecting head.

6. The three-dimensional-object printing apparatus according to claim 5, further comprising a pressuring mechanism that pressurizes the liquid supplied from the liquid accumulation section to the pressure control valve.

7. The three-dimensional-object printing apparatus according to claim 1, wherein
at least a portion of the supply channel is arranged inside the arm.

8. The three-dimensional-object printing apparatus according to claim 1, wherein
the arm includes
a first arm to which the liquid ejecting head is fixed and
a second arm that supports the first arm so as to be configured to pivot about a pivot axis,
the liquid ejecting head includes a nozzle surface on which a nozzle for ejecting the liquid is provided, and
the pivot axis overlaps the nozzle surface when viewed along the pivot axis.

9. The three-dimensional-object printing apparatus according to claim 1, wherein
the liquid ejecting head includes a nozzle row in which a plurality of nozzles for ejecting the liquid and the plurality of nozzles are arrayed in an array direction,
the nozzle row includes end nozzles which are provided in both ends in the array direction, and
a position of at least a portion of the pressure control valve is between the end nozzles when viewed along the direction perpendicular to the array direction.

10. The three-dimensional-object printing apparatus according to claim 3, wherein
the liquid ejecting head includes a nozzle row in which a plurality of nozzles for ejecting the liquid are arrayed, and
the flexible section is formed so as to expand in a direction not crossing an array direction of the plurality of nozzles.

11. The three-dimensional-object printing apparatus according to claim 3, wherein
the liquid ejecting head includes a nozzle row in which a plurality of nozzles for ejecting the liquid are arrayed, and
a position of at least a portion of the valve body in the gravity direction is above a position of a lowermost nozzle in the gravity direction among the plurality of nozzles at a time of starting printing.

12. The three-dimensional-object printing apparatus according to claim 1, wherein
the liquid ejecting head includes a nozzle row in which a plurality of nozzles for ejecting the liquid are arrayed,
the nozzle row is divided into a plurality of nozzle sections, and
a driving pulse used for driving of the liquid ejecting head varies between the nozzle sections.

13. The three-dimensional-object printing apparatus according to claim 1, further comprising a control circuit configured to generate a driving signal to control a piezoelectric element of the liquid ejecting head, wherein an amplitude of the driving signal is changed based on a distance between the liquid ejecting head and the pressure control valve along the gravity direction.

14. The three-dimensional-object printing apparatus according to claim 1, wherein the liquid ejecting head and the pressure control valve are provided at a liquid ejecting head unit.

15. A three-dimensional-object printing apparatus comprising:
a base;
an arm supported by the base;
a liquid ejecting head that includes a nozzle surface, on which a plurality of nozzles are disposed, is fixed to a tip end of the arm, and ejects a liquid onto a work piece;
a liquid accumulation section that accumulates the liquid;
a supply channel which communicates the liquid accumulation section and the liquid ejecting head each other and along which the liquid is supplied from the liquid accumulation section to the liquid ejecting head;
a pressure control valve that is provided halfway in the supply channel and controls a pressure of the liquid supplied to the liquid ejecting head; and
a controller that controls the arm, wherein
the arm includes N movable sections that change an angle of the liquid ejecting head with respect to a horizontal plane, N being 1 or more,
the pressure control valve is fixed to the arm,
K pieces of the movable sections are provided between the pressure control valve and the base, K being 1 or more and N or less,
a position of the pressure control valve with respect to the horizontal plane is changed by the K pieces of the movable sections,
the controller controls the arm to change a position of the liquid ejecting head to a first position in which the nozzle surface of the liquid ejecting head is parallel with the horizontal plane and a second position in which the nozzle surface of the liquid ejecting head is not parallel with the horizontal plane and a negative pressure of the liquid in the liquid ejecting head is greater than the pressure of liquid in the first position,
a distance between the liquid ejecting head and the pressure control valve along an arrangement direction of the liquid ejecting head and the pressure control valve is same in the first position and the second position,
the liquid ejecting head is driven by using a first driving pulse when the liquid ejecting head is in the first position,
the liquid ejecting head is driven by using a second driving pulse, a waveform of which differs from a waveform of the first driving pulse, when the liquid ejecting head is in the second position, and
an amplitude of the second driving pulse is greater than an amplitude of the first driving pulse.

* * * * *